United States Patent
Fuchikami

(10) Patent No.: US 11,962,947 B2
(45) Date of Patent: Apr. 16, 2024

(54) PROJECTION SYSTEM, PROJECTION ADJUSTMENT PROGRAM, AND PROJECTION METHOD

(71) Applicant: PANASONIC INTELLECTUAL PROPERTY MANAGEMENT CO., LTD., Osaka (JP)

(72) Inventor: Ryuji Fuchikami, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 671 days.

(21) Appl. No.: 17/253,008

(22) PCT Filed: May 15, 2019

(86) PCT No.: PCT/JP2019/019414
§ 371 (c)(1),
(2) Date: Dec. 16, 2020

(87) PCT Pub. No.: WO2019/244523
PCT Pub. Date: Dec. 26, 2019

(65) Prior Publication Data
US 2021/0274139 A1   Sep. 2, 2021

(30) Foreign Application Priority Data

Jun. 20, 2018   (JP) .................. 2018-117208

(51) Int. Cl.
*G06T 7/521*   (2017.01)
*G01S 17/89*   (2020.01)
(Continued)

(52) U.S. Cl.
CPC .......... *H04N 9/3194* (2013.01); *G01S 17/89* (2013.01); *G03B 17/54* (2013.01); *G06T 7/521* (2017.01);
(Continued)

(58) Field of Classification Search
None
See application file for complete search history.

(56) References Cited

U.S. PATENT DOCUMENTS

2010/0315825 A1*  12/2010  Kawamura .......... H04N 9/3197
                                               362/458
2016/0088275 A1    3/2016  Fuchikami
(Continued)

FOREIGN PATENT DOCUMENTS

JP   2001-082940   3/2001
JP   2005-258622   9/2005
(Continued)

OTHER PUBLICATIONS

International Search Report (ISR) from International Searching Authority (Japan Patent Office) in International Pat. Appl. No. PCT/JP2019/019414, dated Jun. 11, 2019, along with an English language translation thereof.
(Continued)

*Primary Examiner* — Hina F Ayub
(74) *Attorney, Agent, or Firm* — Greenblum & Bernstein, P.L.C.

(57) ABSTRACT

A projection system includes a projection apparatus configured to perform position measurement and projection on a target object. The projection apparatus includes: an invisible light projector configured to project measurement light of invisible light onto the target object; a light receiver configured to receive reflected light of the measurement light reflected from the target object; and a calculator configured to calculate position information of the target object based on the reflected light of the measurement light. The calculator is configured to perform a mask processing of limiting a part of a projection range in which the measurement light is projected.

10 Claims, 15 Drawing Sheets

(51) Int. Cl.
  *G03B 17/54* (2021.01)
  *G06T 7/73* (2017.01)
  *H04N 9/31* (2006.01)
(52) U.S. Cl.
  CPC ............. *G06T 7/73* (2017.01); *H04N 9/3147* (2013.01); *G06T 2207/10028* (2013.01); *G06T 2207/10048* (2013.01)

(56) References Cited

U.S. PATENT DOCUMENTS

| | | | |
|---|---|---|---|
| 2016/0191873 A1* | 6/2016 | Tagami | G01B 11/2536 |
| | | | 348/760 |
| 2017/0347076 A1 | 11/2017 | Fuchikami et al. | |

FOREIGN PATENT DOCUMENTS

| | | |
|---|---|---|
| JP | 2007-075887 | 3/2007 |
| JP | 2011-021970 | 2/2011 |
| JP | 2013-192189 | 9/2013 |
| JP | 2016-130663 | 7/2016 |
| JP | 2017-215374 | 12/2017 |
| WO | 2011/001507 | 1/2011 |
| WO | 2015/125403 | 8/2015 |

OTHER PUBLICATIONS

Written Opinion (WO) from International Searching Authority (Japan Patent Office) in International Pat. Appl. No. PCT/JP2019/019414, dated Jun. 11, 2019, along with an English language translation thereof.

Takei et al., "Development of a 3,000-fps 3D Imaging System Using a High-Speed Projector", Proceedings of the 2007 JSME Conference on Robotics and Mechatronics, The Japan Society of Mechanical Engineers, Akita, May 10-12, 2007, pp. 1P1-M02(1) to 1P1-M02(4).

* cited by examiner (X9a)  (X9b)

(X8a)  (X8b)

(X7a)  (X7b)

(Y9a)  (Y9b)

(Y8a)  (Y8b)

(Y7a)  (Y7b)

PROJECTION SYSTEM, PROJECTION ADJUSTMENT PROGRAM, AND PROJECTION METHOD

TECHNICAL FIELD

The present disclosure relates to a projection system that projects a video onto a target object, a projection adjustment program, and a projection method used in the projection system.

BACKGROUND ART

A technology of projecting a video onto a target object such as a screen or a structure, that is, a so-called projection mapping technology is known. A projection mapping system includes a system having an image capturing function. For example, Patent Literature 1 discloses a system that can simultaneously acquire a 3D shape of a subject and capture an image of the object with visible light.

Various projection systems that use a plurality of projection apparatuses have been proposed for applications such as a large-screen display. As this type of projection system, there are a multi-projection system in which a plurality of projection apparatuses are arranged in horizontal and vertical directions and projection screens of the projection apparatuses are displayed side by side to perform a larger screen display, and a stack projection system in which projection screens of projection apparatuses are displayed in an overlapping manner to improve brightness of the projection screens. For example, Patent Literature 2 discloses a system that can easily operate individual projector apparatuses or collectively operate all projector apparatuses by performing infrared communication among a plurality of projector apparatuses.

CITATION LIST

PATENT LITERATURE

Patent Literature 1: JP-A-2005-258622
Patent Literature 2: WO-A1-2011/001507

SUMMARY OF INVENTION

TECHNICAL PROBLEM

It is an object of the present disclosure to provide a projection system, a projection adjustment program, and a projection method that can appropriately avoid an error region of a projection range when measuring a target object in the projection system.

SOLUTION TO PROBLEM

The present disclosure provides a projection system including a projection apparatus configured to perform position measurement and projection on a target object, wherein the projection apparatus includes an invisible light projection unit configured to project measurement light of invisible light onto the target object, a light reception unit configured to receive reflected light of the measurement light reflected from the target object, and a calculation unit configured to calculate position information of the target object based on the reflected light of the measurement light, and wherein the projection apparatus is configured to perform a mask processing of limiting a part of a projection range in which the measurement light is projected.

Further, the present disclosure provides a projection adjustment program configured to perform a processing related to adjustment of a projection operation of a projection apparatus by a computer in a projection system including the projection apparatus configured to perform position measurement and projection on a target object, the projection adjustment program being configured to: perform position measurement by causing the projection apparatus of the projection system to project measurement light of invisible light onto the target object, receiving reflected light of the measurement light reflected from the target object, and calculating position information of the target object based on the reflected light of the measurement light; detect an error region where a defect occurs in a measurement result of the position measurement; and set, for a target projection apparatus, a mask region for a mask processing of limiting a part of a projection range at a time of projecting the measurement light by using a measurement result of the error region.

Further, the present disclosure provides a projection method including: a step of causing a projection apparatus to perform a mask processing of limiting a part of a projection range in which measurement light of invisible light is projected; a step of projecting the measurement light onto the projection range partially limited by the mask processing; a step of receiving reflected light of the measurement light; a step of calculating position information of a target object positioned within the projection range based on the reflected light of the measurement light; a step of determining a projection position of a content based on the calculated position information of the target object; and a step of projecting the content onto the determined projection position.

ADVANTAGEOUS EFFECTS OF INVENTION

According to the present disclosure, the error region of the projection range can be appropriately avoided when measuring the target object in the projection system.

DESCRIPTION OF EMBODIMENTS

[Introduction to Contents of Embodiment]

Figure 1:
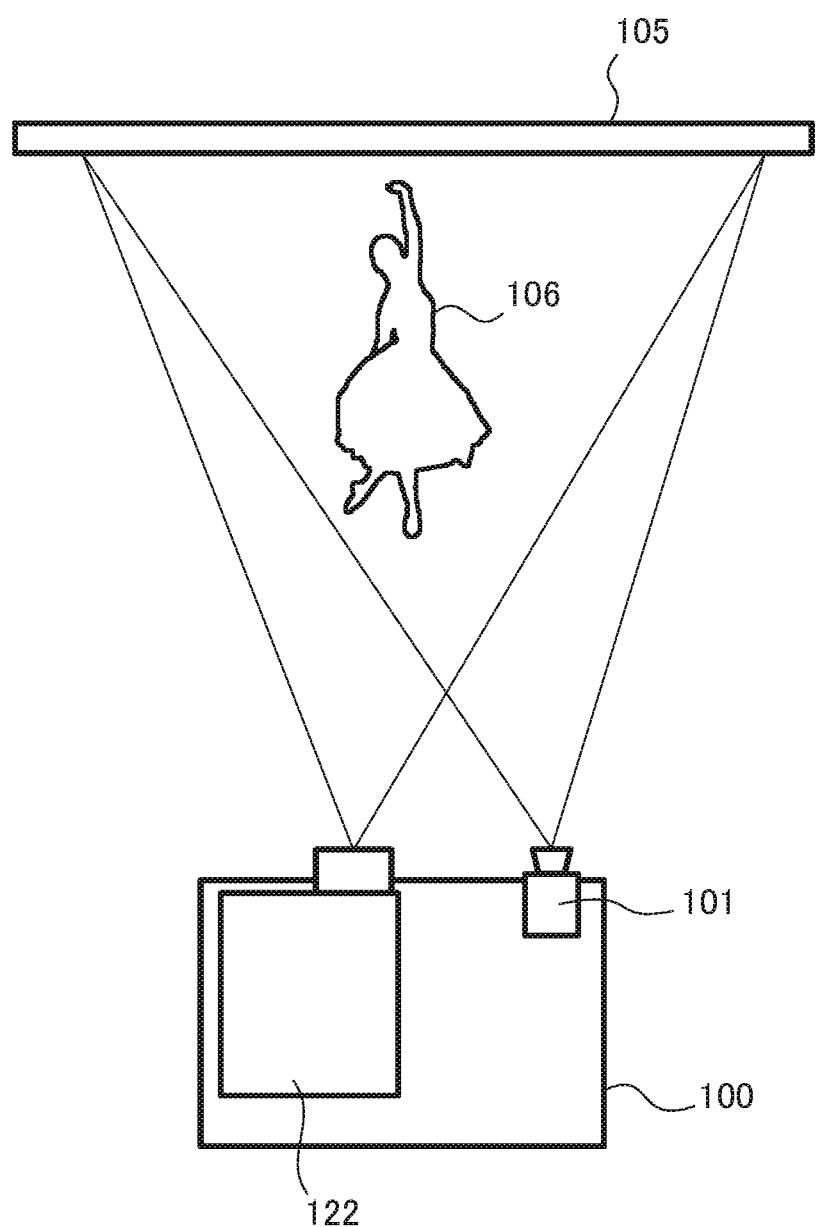
FIG. 1 is a diagram illustrating a summary of a configuration and functions of a measurement projection apparatus according to the present embodiment.

When it is considered that a video content is projected onto a target object to be projected, such as projection mapping, it is required to align the video content on the target object as intended and project the video content. Finally, it is necessary to acquire geometric position information of the target object viewed from a coordinate system of a projection apparatus.

When projection is performed on a static target object, pre-measurement may be performed only once separately from the projection. In that case, interference between projection and measurement can be ignored. On the other hand, it is considered to perform projection with no error in real time on a target object that dynamically moves and/or deforms based on a result of 3D measurement while performing the 3D measurement on the target object. In that case, it is required to perform measurement so as not to influence a video content being projected.

However, the above-described Patent Literature 1 merely discloses that, by projecting a pattern image for the 3D measurement with invisible light, measurement can be performed without being influenced by visible light from a visible light source installed at another location. According to the technology of Patent Literature 1, only measurement results conforming to a coordinate system of an image capturing device can be acquired.

In a field of measurement, in addition to the above-described Patent Literature 1, for example, systems disclosed in Reference Non-Patent Literature 1 and Reference Patent Literature 3 are known.

[Reference Patent Literature 3] JP-A-2013-192189

[Reference Non-Patent Literature 1] "Development of a 3,000-fps 3D Imaging System Using a High-Speed Projector", Proceedings of the 2007 JSME Conference on Robotics and Mechatronics, "1P1-M02 (1)"-"1P1-M02 (4)", 2007-05-11

Reference Non-Patent Literature 1 discloses a method for measuring a 3D shape at a high speed by using a light pattern projection. The measurement system of Reference Non-Patent Literature 1 includes an image capturing apparatus and a projection apparatus including a light source, a lens, a mirror element or a liquid crystal element. The image capturing apparatus has a function of performing high-speed image capturing. For example, the image capturing apparatus can perform high-speed image capturing at 6000 fps. The projection apparatus can project a binary pattern having 1024×768 pixels at 6000 fps or more.

Reference Patent Literature 3 discloses a measurement system that adjusts a video content based on image capturing data. The measurement system of Reference Patent Literature 3 includes an image capturing apparatus, a projection apparatus, and a calculation apparatus. The calculation apparatus performs image recognition of a projection target based on an image capturing result acquired by the image capturing apparatus. The calculation apparatus generates a video of a region such that a video content is projected onto the region where the projection target is recognized. The projection apparatus projects the video content onto the projection target.

The above-described Reference Non-Patent Literature 1 merely discloses a technical level for performing the 3D measurement at a high speed. Since an image having several tens of frames is required to transmit coordinate information of the projection apparatus, it has been conventionally difficult to perform the 3D measurement of a moving object at a high speed. The technology of Reference Non-Patent Literature 1 is considered to be meaningful in that it suggests a possibility that measurement can be performed at a high speed.

However, Reference Non-Patent Literature 1 only discloses a technology of a 3D measurement unit, and does not refer to any coordinate system of the projection apparatus. Further, Reference Non-Patent Literature 1 refers to an offline processing after high-speed image capturing, that is, a processing in non-real time. Incidentally, in a computer architecture apparatus such as a personal computer that is premised on performing image processing at 60 Hz or the like, a delay of several tens of milliseconds or more occurs in input and output. As a result, it is difficult to capture an image of a moving object while projecting a video onto the moving object and feed back the result to the projection in real time.

According to the technology of the above-described Reference Patent Literature 3, parallax is generated when positions of the image capturing apparatus and the projection apparatus are different from each other. However, Reference Patent Literature 3 does not refer to any solution to the parallax and does not refer to an increase in a speed of the system.

In view of such a situation, the inventor of the present application has conceived a projection system that includes an invisible light projection device that can perform high-speed projection of invisible light such as infrared light, a visible light projection device that can perform high-speed projection of visible light, and an image capturing device that can perform high-speed image capturing, that can measure a position of a target object with high accuracy by performing projection and image capturing of measurement light by using pattern light of invisible light at a high speed, and that can perform projection by aligning a video content of visible light on the target object as intended.

Here, a projection system is assumed in which a plurality of projection apparatuses that measure a position of a target object by projecting measurement light at a high speed are arranged. In such a projection system, it is required to adjust a projection time and a projection range by the plurality of projection apparatuses, so that position measurement of the target object and video projection can be performed with high accuracy. The above-described Patent Literature 2 merely discloses that presence of another projection apparatus can be detected and the plurality of projection apparatuses can be operated by performing infrared communication among the plurality of projection apparatuses.

In a projection system that performs position measurement and video projection of a target object by using a plurality of projection apparatuses as described above, when projection ranges of the plurality of projection apparatuses overlap each other, interference may occur in measurement light in an overlapping region, and accurate position measurement may not be performed. Further, when a plurality of projection apparatuses that can perform highly accurate position measurement are arranged, it may not be possible to easily grasp a positional relationship of a plurality of projection ranges such as an arrangement of projection ranges of the projection apparatuses and overlapping of the projection ranges.

Accordingly, in the projection system that uses the plurality of projection apparatuses, when there is interference or an obstacle due to another projection apparatus, there is a problem that an error occurs in the position measurement and accurate position measurement cannot be performed. Further, even when a single projection apparatus is used, there is a problem that accurate position measurement cannot be performed due to an error when there are some obstacles. In view of these problems, it is desirable to appropriately avoid an error region of a projection range by a method such as setting a mask region in the projection range of the projection apparatus.

Hereinafter, each embodiment in which the configuration according to the present disclosure is specifically disclosed will be described in detail with reference to the drawings as appropriate. However, unnecessarily detailed description may be omitted. For example, detailed description of a well-known matter or repeated description of substantially the same configuration may be omitted. This is to avoid unnecessary redundancy in the following description and to facilitate understanding of those skilled in the art. It should be noted that the accompanying drawings and the following description are provided for a thorough understanding of the present disclosure by those skilled in the art, and are not intended to limit the subject matter recited in the claims.

[Present Embodiment]

As an example of the present embodiment, a projection system, a projection adjustment program, and a projection method are exemplified in which, in the projection system that uses a plurality of projection apparatuses, a mask region is set in a projection range of a target projection apparatus according to a predetermined condition, and accurate position measurement can be performed by avoiding an error region.

(Summary of Measurement Projection Apparatus and Projection System)

FIG. 1 is a diagram illustrating a summary of a configuration and functions of the measurement projection apparatus according to the present embodiment. The present embodiment discloses an example in which a position of a target object is measured using a measurement projection apparatus 100 as shown in FIG. 1 as a projection apparatus that projects a video onto the target object, and a video is projected according to position information of the target object. Here, as a target object onto which a video is projected, a first target object 105 formed of a flat or curved screen, a wall surface, or the like and a second target object 106 formed of a person or the like positioned in front of the first target object 105 are assumed. Hereinafter, the first target object 105 and the second target object 106 may be simply referred to as the target objects 105 and 106. It is assumed that the second target object 106 such as a person moves and moves each part of a body by performing a dance or the like in front of the first target object 105 such as a screen. That is, the target object 106 is in a state where a shape and a position of each part are changed according to movement of the target object 106. Therefore, in order to project a predetermined video content onto the target objects 105 and 106, it is necessary to measure a position of the second target object 106 with respect to the first target object 105 and acquire accurate position information of the target object 106.

The measurement projection apparatus 100 includes an image capturing device 101 as an example of a light reception unit, and a projection device 122 that includes an infrared-light projection unit as an example of an invisible light projection unit that projects infrared light as an example of measurement light of invisible light and a visible light projection unit that projects visible light, and that can project infrared light for measurement and visible light for video projection. The measurement projection apparatus 100 measures positions of the target objects 105 and 106 at high speed by projecting pattern light of infrared light whose projection coordinates are encoded by the infrared-light projection unit of the projection device 122 at high speed and capturing images of the target objects 105 and 106 at high speed by the image capturing device 101. Details of the position measurement of the target objects will be described later. Then, based on position information of the target objects 105 and 106, the measurement projection apparatus 100 projects a predetermined video by the visible light projection unit of the projection device 122 in a state where the measurement projection apparatus 100 always performs alignment for a position of the moving target object 106 in particular. The measurement projection apparatus 100 may separately include an invisible light projection device and a visible light projection device instead of the projection device 122. In the present embodiment, it is assumed that a plurality of measurement projection apparatuses 100 are appropriately arranged to form a projection system as described later.

Examples of a projection system in which the plurality of measurement projection apparatuses 100 are arranged include, for example, a projection system that performs multi-plane projection on a target object to cover a large region, a projection system that performs high-luminance projection by superimposed projection, a projection system in which wrapping projection is performed by being disposed in a circumferential shape so as to surround a periphery of the target object, and the like. In such a projection system, interference occurs in measurement light in a region where projection ranges overlap, and there may be a problem that position measurement of a target object cannot be accurately performed. In the present embodiment, an error region is avoided and the above problem is solved by setting a mask region in a projection range of the target projection apparatus according to a predetermined condition such as a priority order.

(Configuration of Measurement Projection Apparatus)

Next, an example of a configuration and operations of the measurement projection apparatus will be described in more detail.

Figure 2:
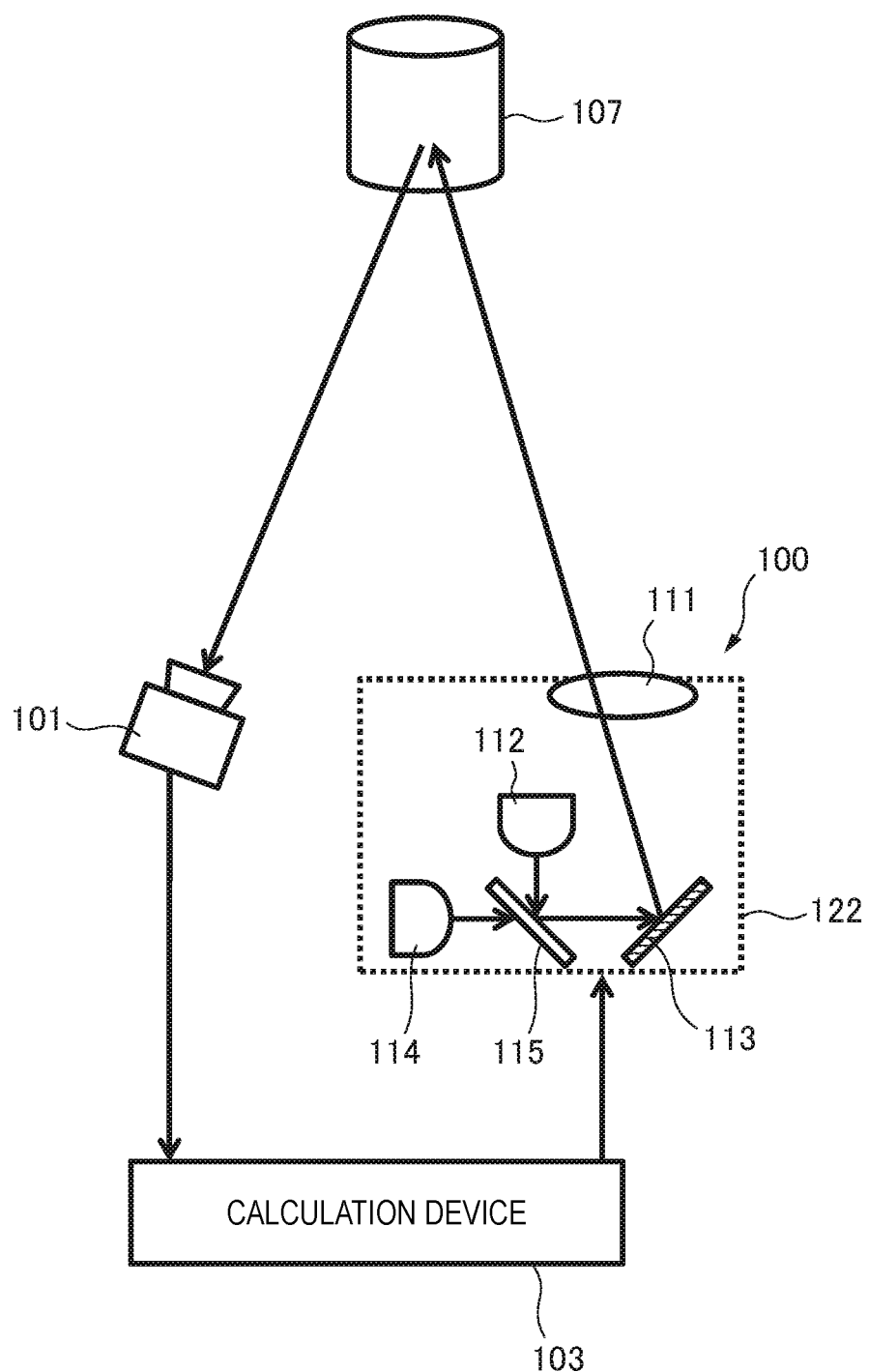
FIG. 2 is a diagram showing a schematic configuration of the measurement projection apparatus according to the present embodiment.

FIG. 2 is a diagram showing a schematic configuration of the measurement projection apparatus according to the present embodiment. The measurement projection apparatus 100 includes the image capturing device 101, the projection device 122, and a calculation device 103.

In the present embodiment, the image capturing device 101 can perform image capturing at 6000 frames per second as in Reference Non-Patent Literature 1. Further, the image capturing device 101 has a large-scale transfer band without performing buffering therein, and can output image capturing data to the calculation device 103. Furthermore, the image capturing device 101 has sensitivity in an infrared light region. Hereinafter, on a premise of the above, an example of functions and operations of devices will be described.

The projection device 122 is configured with an integrated projection device including the infrared-light projection unit as an example of the invisible light projection unit and the visible light projection unit. The infrared-light projection unit of the projection device 122 projects, as an example of the measurement light, pattern light indicating a pattern image obtained by encoding projection coordinates defined in a projection coordinate system. Further, the visible light projection unit of the projection device 122 projects video light representing video content. The projection device 122 may be configured such that the invisible light projection device and the visible light projection device are separately provided. In the present description, the projection coordinate system means a coordinate system that specifies coordinates of each pixel of an image of video content that is a projected image projected from the visible light projection unit of the projection device 122. The coordinates that specify each pixel of the image of the video content are referred to as "projection coordinates" of the projection coordinate system. The projection coordinates also correspond to coordinates of each pixel of the pattern image projected from the infrared-light projection unit of the projection device 122.

The projection device 122 includes a lens optical system 111, an infrared LED light source 112, a display device 113, a visible light LED light source 114, and a dichroic mirror 115. The lens optical system 111 may be configured with a single lens, or may be configured with a plurality of lenses (a lens group). The plurality of lenses can include, for example, a zoom lens and a focus lens.

The infrared LED light source 112 emits infrared light, which is an example of invisible light, as the pattern light. The invisible light has, for example, a wavelength in an infrared light band (approximately 700 nm to 1000 nm). In the present embodiment, the infrared LED light source is used as a light source of invisible light, but a light source that emits ultraviolet rays can also be used.

The visible light LED light source 114 emits light in a visible light band (approximately 380 nm to 780 nm) as video light. From a viewpoint of simplification, the visible light LED light source 114 can be a monochromatic visible light source. However, it is needless to say that a full-color video may be projected by providing three light sources for three colors of red, blue, and green. Further, if there is a color wheel that can rotate at a sufficiently high speed, the full-color video can be projected by providing a white light source such as a high-pressure mercury lamp instead of the visible light LED light source 114 and attaching the white light source to an output. Further, as a visible light source, it is possible to use a light source from which light can be extracted for each wavelength from the high-pressure mercury lamp by a dichroic prism or the like. Accordingly, any light source can be used in the present disclosure.

The display device 113 is, for example, an optical device such as a digital micromirror device (DMD) in which micromirrors are arranged on a square of 1024×768, and generates a pattern image in which the projection coordinates are encoded. The display device 113 can output a video of 30000 frames per second in a binary pattern. The display device 113 may be configured with a transmissive optical element instead of a reflective optical element, or may also be replaced by a liquid crystal device.

The dichroic mirror 115 has characteristics of transmitting visible light and reflecting infrared light. As the dichroic mirror 115, a known dichroic mirror can be widely used. A display device may be provided corresponding to the infrared LED light source 112 and the visible light LED light source 114, a dichroic prism may be provided instead of the dichroic mirror 115, and light from the two light sources and the display device may be guided to the lens optical system 111.

The image capturing device 101 as an example of the light reception unit receives the pattern light and captures an image to generate a captured image of the pattern light. The image capturing device 101 includes an image sensor, a lens optical system, and the like. For example, an image sensor having a pixel count of 1024×768 can be used in correspondence with the display device 113. In that case, if one pixel has a 8-bit resolution, a transfer band is about 38 Gbps. Here, it is assumed that the calculation device 103 is implemented by, for example, a field programmable gate array (FPGA). In consideration of a current semi-conductor technical level, the transfer band of about 38 Gbps is within a range that can be sufficiently implemented.

The image capturing device 101 has an image capturing coordinate system. In the present description, the image capturing coordinate system means a coordinate system that specifies coordinates of each pixel of a captured image acquired by the image capturing device 101. In distinction from the "projection coordinates", the coordinates of each pixel of the captured image are referred to as "image capturing coordinates" of the image capturing coordinate system.

The calculation device 103 as an example of a calculation unit decodes a captured image into projection coordinate information indicating projection coordinates corresponding to image capturing coordinates defined in an image capturing coordinate system, converts the projection coordinate information into distance information to a target object with reference to the projection coordinate system, and selectively determines a content of a video content according to the distance information.

Figure 3:
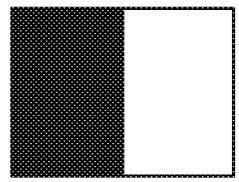
FIG. 3 is a diagram showing an example of invisible light measurement patterns according to the present embodiment.
Figure 3:
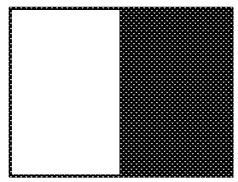
Figure 3:
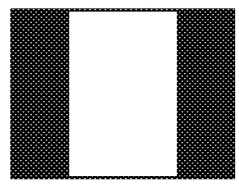
Figure 3:
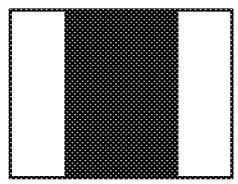
Figure 3:
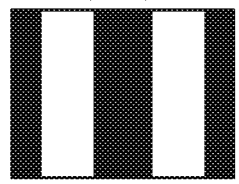
Figure 3:
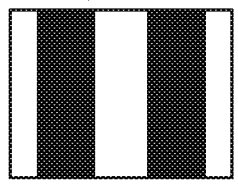
Figure 3:
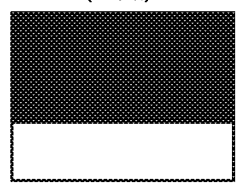
Figure 3:
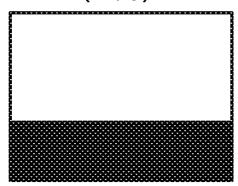
Figure 3:
Figure 3:
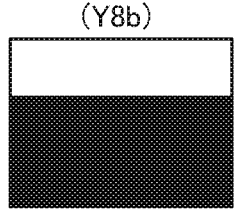
Figure 3:
Figure 3:
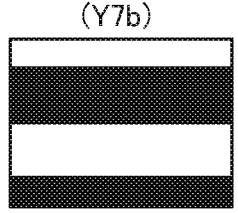

FIG. 3 is a diagram showing an example of invisible light measurement patterns according to the present embodiment. FIG. 3 illustrates a part of encoded pattern images (coordinate patterns) corresponding to the pattern light. The pattern image shown in FIG. 3 is acquired by gray-coding an X coordinate and a Y coordinate of each mirror of the display device 113 having 1024×768 micromirrors and then representing each bit as a black-and-white binary image.

The infrared-light projection unit of the projection device 122 can project the pattern light onto a target object 107 (corresponding to the target objects 105 and 106) based on, for example, a pattern image of 1024×768 pixels. Both an X coordinate and a Y coordinate of a pixel are larger than 512 and equal to or smaller than 1024. In that case, 10 bits from bit0 to bit9 representing the X coordinate are gray-coded. Similar to the X coordinate, 10 bits from bit0 to bit9 representing the Y coordinate are gray-coded. Accordingly, coordinate information can be encoded by allocating 10 bits to each coordinate, that is, 20 bits in total. Hereinafter, an example of encoding 20-bit information by using 40-frame image data will be described.

(X9a) in FIG. 3 shows a pattern image corresponding to bit9 after the X coordinate is gray-coded. Further, in the present embodiment, since the projection coordinates are encoded by Manchester encoding, an inverted pattern image obtained by bit-inverting bit9 is also used. (X9b) in FIG. 3 shows an inverted pattern image obtained by inverting the image pattern of (X9a). Similarly, (X8a) in FIG. 3 shows a pattern image corresponding to bit8 after the X coordinate is gray-coded, and (X8b) shows an inverted pattern image obtained by inverting the image pattern of (X8a). (X7a) in FIG. 3 shows a pattern image corresponding to bit7 after the X coordinate is gray-coded, and (X7b) shows an inverted pattern image obtained by inverting the image pattern of (X7a).

(Y9a) in FIG. 3 shows a pattern image corresponding to bit9 after the Y coordinate is gray-coded. (Y9b) in FIG. 3 shows an inverted pattern image obtained by inverting the image pattern of (Y9a). Similarly, (Y8a) in FIG. 3 shows a pattern image corresponding to bit8 after the Y coordinate is gray-coded, and (Y8b) shows an inverted pattern image obtained by inverting the image pattern of (Y8a). (Y7a) in FIG. 3 shows a pattern image corresponding to bit7 after the Y coordinate is gray-coded, and (Y7b) shows an inverted pattern image obtained by inverting the image pattern of (Y7a).

Although not shown, there are pattern images and inverted pattern images respectively corresponding to, for example, bits 6 to 0 of the X coordinate and the Y coordinate up to a measurable resolution. The infrared-light projection unit of the projection device 122 sequentially projects 40 patterns including these patterns onto the target object 107. The image capturing device 101 receives reflected light of pattern light from the target object 107, and sequentially captures projected pattern images.

(Functional Configuration of Measurement Projection Apparatus)

Figure 4:
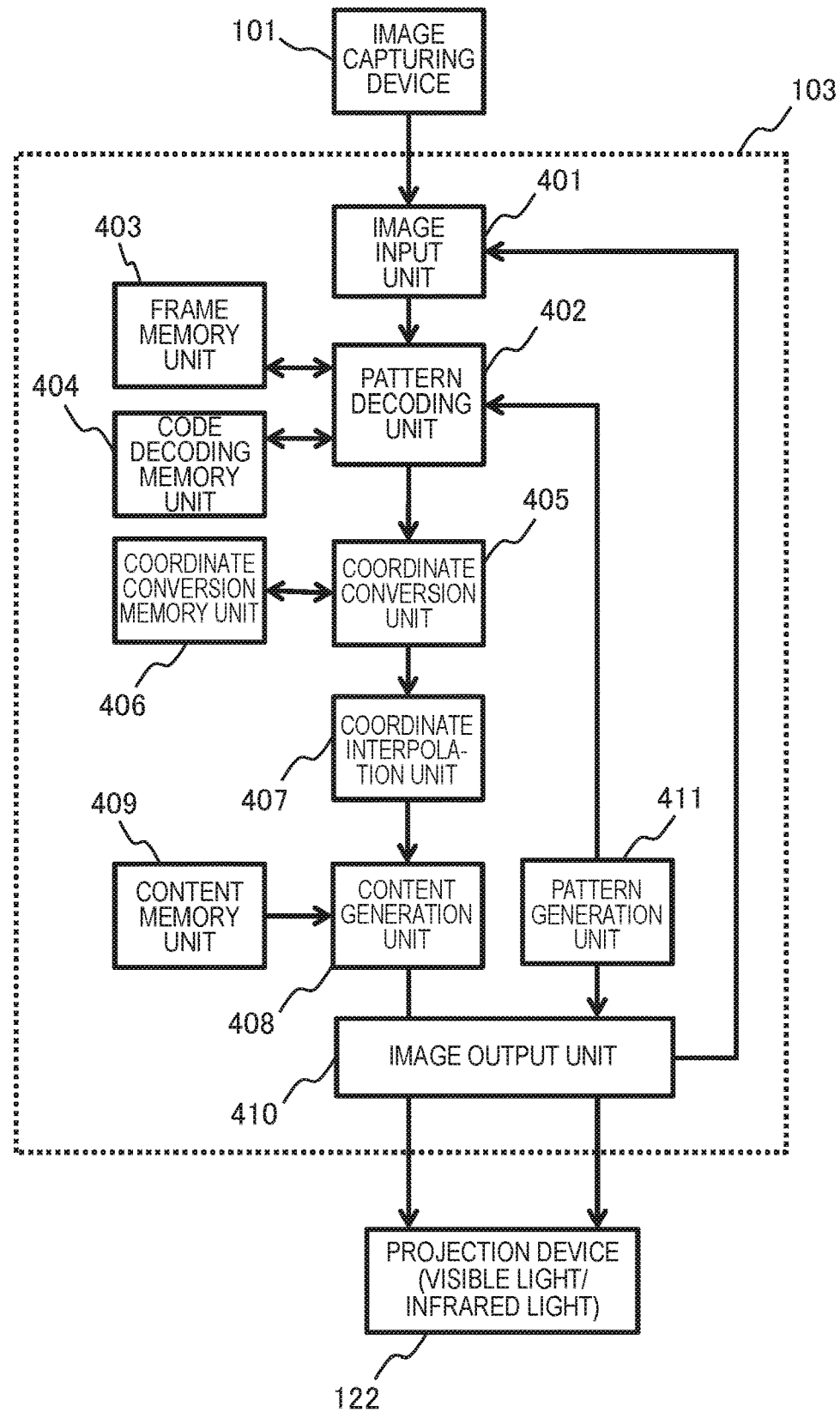
FIG. 4 is a block diagram showing a functional configuration of the measurement projection apparatus according to the present embodiment.

FIG. 4 is a block diagram showing a functional configuration of the measurement projection apparatus according to the present embodiment. The calculation device 103 has a function of controlling the entire measurement projection apparatus 100. The calculation device 103 can be implemented by, for example, a computer, a calculation device represented by a processor, or a semi-conductor integrated circuit. The semi-conductor integrated circuit is, for example, an application specific integrated circuit (ASIC), an FPGA, or the like. The calculation device 103 may implement functions of components by using a memory in which a computer program that exerts the functions of the components is installed and causing a processor in the semi-conductor integrated circuit to sequentially execute the computer program.

The calculation device 103 includes an image input unit 401, a pattern decoding unit 402, a frame memory unit 403, a code decoding memory unit 404, a coordinate conversion unit 405, a coordinate conversion memory unit 406, a coordinate interpolation unit 407, a content generation unit 408, a content memory unit 409, an image output unit 410, and a pattern generation unit 411. Each memory unit in the calculation device 103 can be configured with, for example, a RAM or the like.

Figure 5:
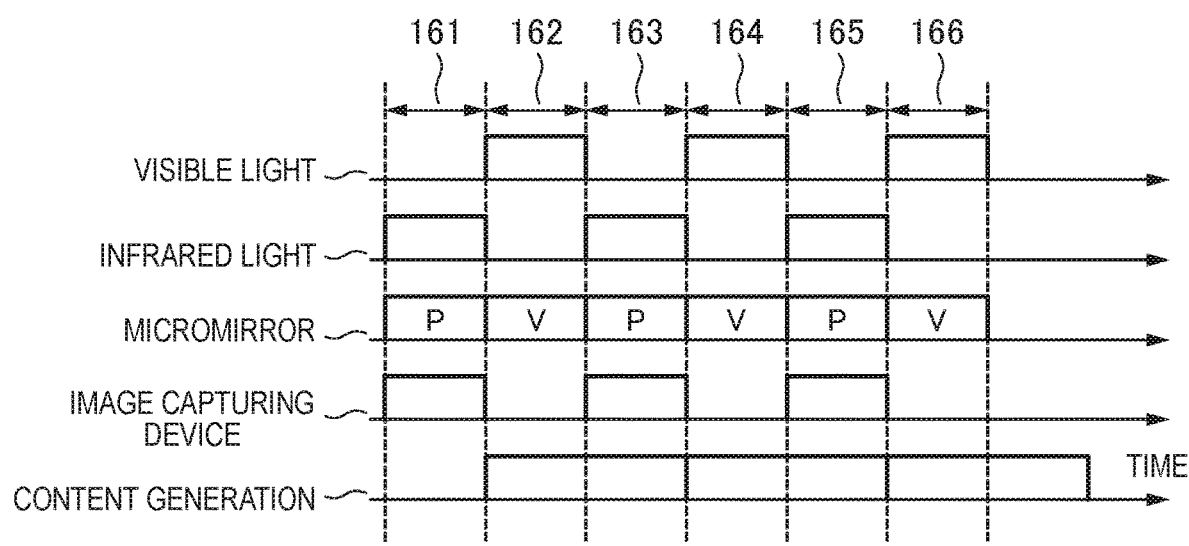
FIG. 5 is a time chart showing an example of operations of the measurement projection apparatus according to the present embodiment.

FIG. 5 is a time chart showing an example of operations of the measurement projection apparatus according to the present embodiment. As shown in FIG. 5, the projection device 122 projects the pattern light in periods 161, 163, and 165 and the video light in periods 162, 164, and 166. That is, the projection device 122 projects the video light and the pattern light by time division multiplexing. "P" of the micromirror in the drawing indicates a pattern image for measurement and "V" indicates a video content as a projected image.

The pattern generation unit 411 turns on the infrared LED light source 112 during the period 161. The pattern generation unit 411 generates a pattern image for pattern projection by the method described above. The pattern generation unit 411 outputs image data indicating a pattern image to the image output unit 410 so as to perform pattern projection for measurement on the display device 113. The image output unit 410 outputs the image data from the pattern generation unit 411 and turning-on information of the infrared LED light source 112 to the projection device 122 and the image input unit 401. Since the pattern light of the measurement light indicating the pattern image is projected as the invisible light, the pattern light of the measurement light is captured and measured by the image capturing device 101, but the pattern light of the measurement light does not influence human vision.

The pattern generation unit 411 can output one pattern in 1/6000 seconds. The pattern generation unit 411 outputs a total of 40 frames of 10-bit coordinate images of the X coordinate and the Y coordinate and inverted images thereof during the period 161. On the other hand, the image capturing device 101 captures an image at 40 frames in synchronization with a rate at which frames of the display device 113 are output. In this example, a length of the period 161 is, for example, 6.7 milliseconds.

The image output unit 410 outputs a pattern image to the projection device 122 in synchronization with an output timing of the image data of the pattern generation unit 411. The projection device 122 projects the pattern image onto the target object. Further, the image input unit 401 controls exposure of the image capturing device 101 in synchronization with an output timing of the pattern image of the image output unit 410. Accordingly, the image capturing device 101 captures a pattern image of 40 frames.

The image input unit 401 receives a captured image (image capturing data) of the pattern image captured by the image capturing device 101. The image input unit 401 transmits the received image capturing data to the pattern decoding unit 402. The image input unit 401 determines a pattern corresponding to the received image capturing data in synchronization with the image output unit 410.

The pattern decoding unit 402 decodes the captured image showing the pattern image from the image capturing device 101 into the projection coordinate information indicating the projection coordinates corresponding to the image capturing coordinates defined in the image capturing coordinate system. Hereinafter, functions of the pattern decoding unit 402 will be described in more detail.

If the image capturing data received from the image input unit 401 is a non-bit inverted image of the X coordinate and the Y coordinate, the pattern decoding unit 402 writes the image capturing data in the frame memory unit 403. If the image data is a bit-inverted image of the X coordinate and the Y coordinate, the pattern decoding unit 402 reads the non-bit inverted image recorded in the frame memory unit 403 previously and obtains a difference between the two. Accordingly, the difference between the non-bit inverted image and the bit-inverted image is obtained, so that it is possible to distinguish between "0" and "1" of projection light without depending on a color of a projection target or ambient light. A region where the difference is equal to or smaller than a predetermined value can be determined as a region where the projection light is not projected, and the region can be excluded from a measurement target region.

The code decoding memory unit 404 is provided with a writing region for each pixel of the image capturing device 101. The pattern decoding unit 402 obtains the difference between the non-bit inverted image and the bit-inverted image, and then writes bit values of gray-coded coordinate data in the writing region in bit units. A writing operation of the coordinate data is performed for 40 frames during exposure time of the image capturing device 101. Accordingly, information indicating whether the X coordinate and the Y coordinate of the projection device 102 corresponding to pixels of the image capturing device 101 are present and 10-bit values indicating the X coordinate and the Y coordinate when the X coordinate and the Y coordinate are present are written in the code decoding memory unit 404. Finally, the pattern decoding unit 402 reconverts the gray-coded coordinate data recorded in the code decoding memory unit 404 into binary data and outputs the binary data to the coordinate conversion unit 405.

With the above-described processing, it is possible to know from which pixel of the projection device 122 the projection light captured at a certain pixel position of the image capturing device 101 is projected. That is, it is possible to know a correspondence relationship between the projection coordinates defined in the projection coordinate system of the projection device 122 and the image capturing coordinates defined in the image capturing coordinate system of the image capturing device 101. Therefore, if a positional relationship between the image capturing device 101 and the projection device 122 is known, a distance to the target object can be acquired for each image capturing pixel by trigonometry. However, the acquired information is distance information corresponding to image capturing pixels of the image capturing device 101. Therefore, in the present embodiment, the distance information of the image capturing coordinates corresponding to the image capturing pixels of the image capturing device 101 is converted into distance information corresponding to the projection coordinates of the projection device 122.

The coordinate conversion unit 405 writes the data received from the pattern decoding unit 402 in a region of the coordinate conversion memory unit 406 specified by an address corresponding to the projection coordinates of the projection device 122. Thereafter, the coordinate conversion unit 405 reads the distance information from the coordinate conversion memory unit 406 in an order of the X coordinate and the Y coordinate of the projection device 122, thereby generating the distance information corresponding to the projection coordinates of the projection device 122.

At that time, a projection pixel having no corresponding point may be generated. Specifically, in pattern images projected onto the target object, lights corresponding to a plurality of pixels can be captured by one image capturing pixel of the image capturing device 101. In that case, due to characteristics of gray-coding, the projection pixel having no corresponding point is rounded to pixel coordinates of either of two adjacent projection pixels, so that a projection pixel on one side has no corresponding destination.

The coordinate interpolation unit 407 receives the distance information corresponding to the projection coordinates of the projection device 122 from the coordinate conversion unit 405. The coordinate interpolation unit 407 interpolates distance information for projection coordinates having no distance information. This is performed by using an interpolation method such as linear interpolation based on distance information of peripheral coordinates only in a place where a certain number of projection coordinates having distance information that can be interpolated exist in a periphery thereof. The coordinate interpolation unit 407 outputs distance information based on the projection coordinates to the content generation unit 408. As described above, by performing reading of the captured image of the pattern image and calculation of position information including distance information to the target object, a high-speed position measurement operation can be performed in real time.

The content generation unit 408 generates a video content for projection across the period 162 and the period 163. The content generation unit 408 processes video content recorded in advance in the content memory unit 409 based on the distance information received from the coordinate interpolation unit 407, and outputs the processed video content to the image output unit 410. Hereinafter, the processed video content may be referred to as "processed video content" while being distinguished from the unprocessed video content recorded in advance.

The content generation unit 408 generates a video content that does not have coordinate deviation and accurately corresponds to a distance to the target object. Further, the content generation unit 408 can selectively determine a content of the video content according to the distance information. For example, it is possible to perform processings such as cutting out and detecting only an object at a certain distance and accurately drawing a video content for visible light projection. The content generation unit 408 outputs the processed video content for projection to the image output unit 410.

The image output unit 410 outputs a video content for visible light projection generated in the period 162 and the period 163 to the projection device 122 in the period 164. The projection device 122 turns on the visible light LED light source 114, and projects video light corresponding to the video content by the display device 113. The display device 113 can output 30000 binary frames per second. Therefore, for example, it is possible to project an image of 256 gradations by using 255 frames in 8.5 milliseconds. Since the projection is performed with the visible light source, the projection is visually recognized by a human.

In the period 163, in parallel with the generation of the video content for the projection, projection and image capturing of the pattern image by infrared light are performed in the same manner as in the period 161. The content generation unit 408 generates a video content that does not have a coordinate deviation and accurately corresponds to a distance to the target object across the period 164 and the period 165. Then, in the period 166, the projection device 122 projects the video content for the projection. Accordingly, position measurement and projection can be continuously performed.

A repeated cycle of measurement and projection is, for example, 15.2 milliseconds if measurement time (the period 161) is 6.7 milliseconds and projection time (the period 162) is 8.5 milliseconds. This means that the cycle can be implemented with a throughput of 60 Hz or higher. Further, time from measurement to reflection of a measurement result (hereinafter, referred to as "delay time") can be set to 15.2 milliseconds, which is the same as that of the repeated cycle. Accordingly, since the throughput of 60 Hz or higher can be achieved, a flicker of a projected image due to non-display time such as a measurement period in which the video content is not projected can be sufficiently reduced to a level that is not noticeable to a human eye. In FIG. 5, the delay time corresponds to a total time of the period 162 and the period 163.

In the measurement projection apparatus 100 of the present embodiment, by performing the video projection and the position measurement with the same measurement projection apparatus, it is possible to prevent occurrence of a deviation between the projection and the measurement in principle, and to implement superimposition of geometric measurement that does not interfere with a video of visible light. Further, if the calculation device 103 can decode a pattern image captured by the image capturing device 101, the calculation device 103 can withstand a relative position measurement. Therefore, even when installation accuracy is not sufficiently secured, the calculation device 103 can withstand practical use. In this regard, simplicity of installation can be secured. Further, high robustness can be acquired against an increase in an error of an installation relationship due to deterioration over time.

In the calculation device 103, the pattern generation unit 411 performs a mask processing of limiting a part of a projection range in which measurement light can be projected. At this time, the pattern generation unit 411 sets a part of a pattern image corresponding to the mask region to be not transmitted and masks a partial region of the projection range. The projection device 122 blocks light of the mask region by the display device 113, turns on the infrared LED light source 112 to project the measurement light into the projection range partially limited by the mask processing.

(Configuration of Projection System)

Figure 6:
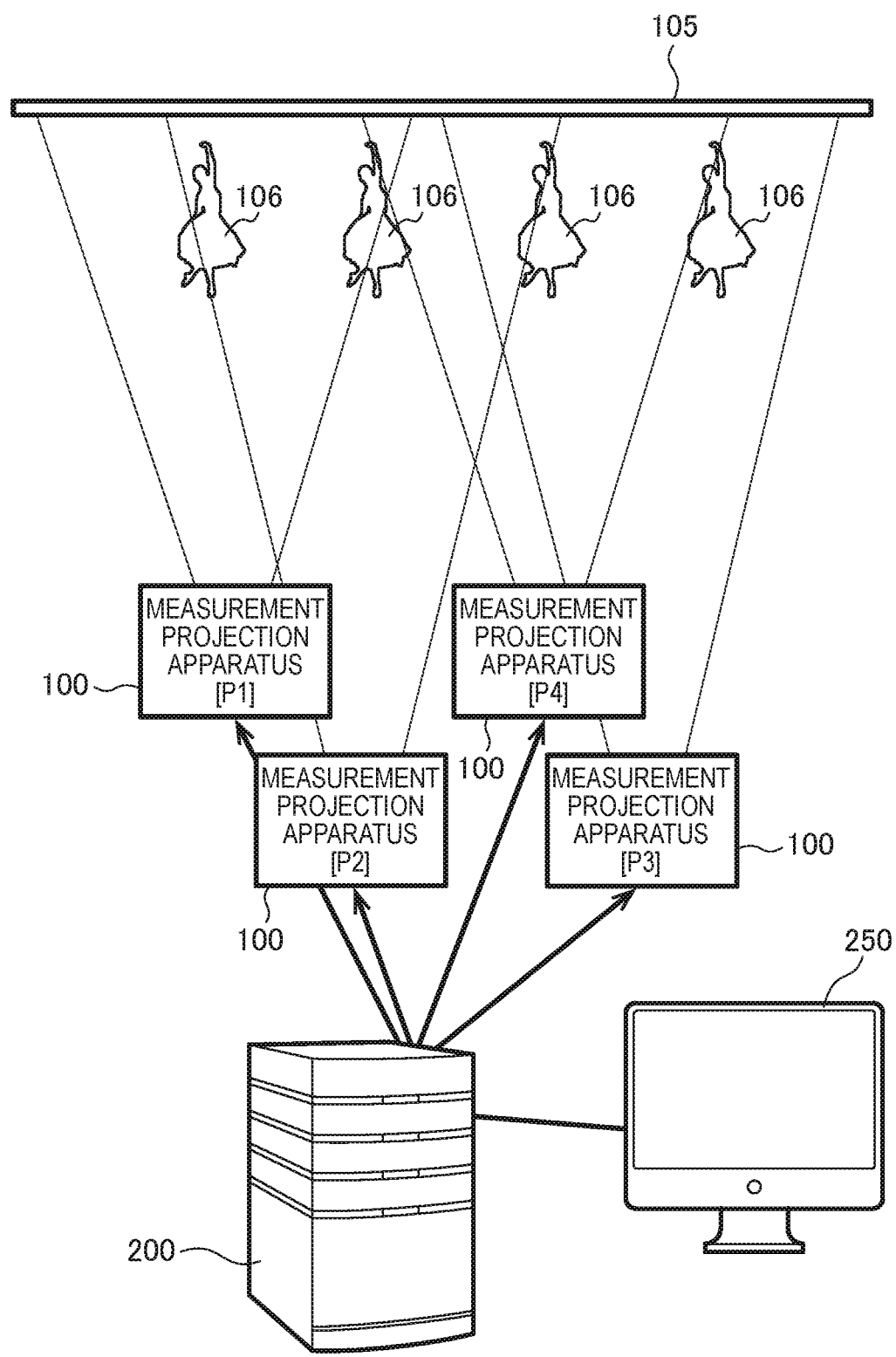
FIG. 6 is a diagram showing an example of a configuration of a projection system according to the present embodiment.

FIG. 6 is a diagram showing an example of a configuration of the projection system according to the present embodiment. The present embodiment shows an example in which, in the projection system as shown in FIG. 6, a projection adjustment apparatus 200 configured with a personal computer (PC) or the like is used to adjust projection operations of the plurality of measurement projection apparatuses 100, or to support adjustment work of a projection operation by a user. The projection system includes the plurality of (four in the illustrated example) measurement projection apparatuses 100 and the projection adjustment apparatus 200 that performs a processing related to adjustment of a projection operation of the measurement projection apparatus 100. Here, it is assumed that a projection range is set such that parts of projection ranges of the measurement projection apparatuses 100 overlap so as to cover a large region by performing the multi-plane projection on the target objects 105 and 106 by the plurality of measurement projection apparatuses 100. The illustrated example shows a configuration that uses four measurement projection apparatuses P1, P2, P3, and P4.

The projection adjustment apparatus 200 is connected to a monitor 250 including a display for displaying information, and displays a display screen including various pieces of projection information for adjusting a projection operation on the monitor 250. The projection adjustment apparatus 200 is configured with an information processing apparatus such as a PC including a processor and a memory and executes a predetermined computer program, so that functions such as display of projection information and automatic adjustment of a projection operation are implemented.

Figure 7:
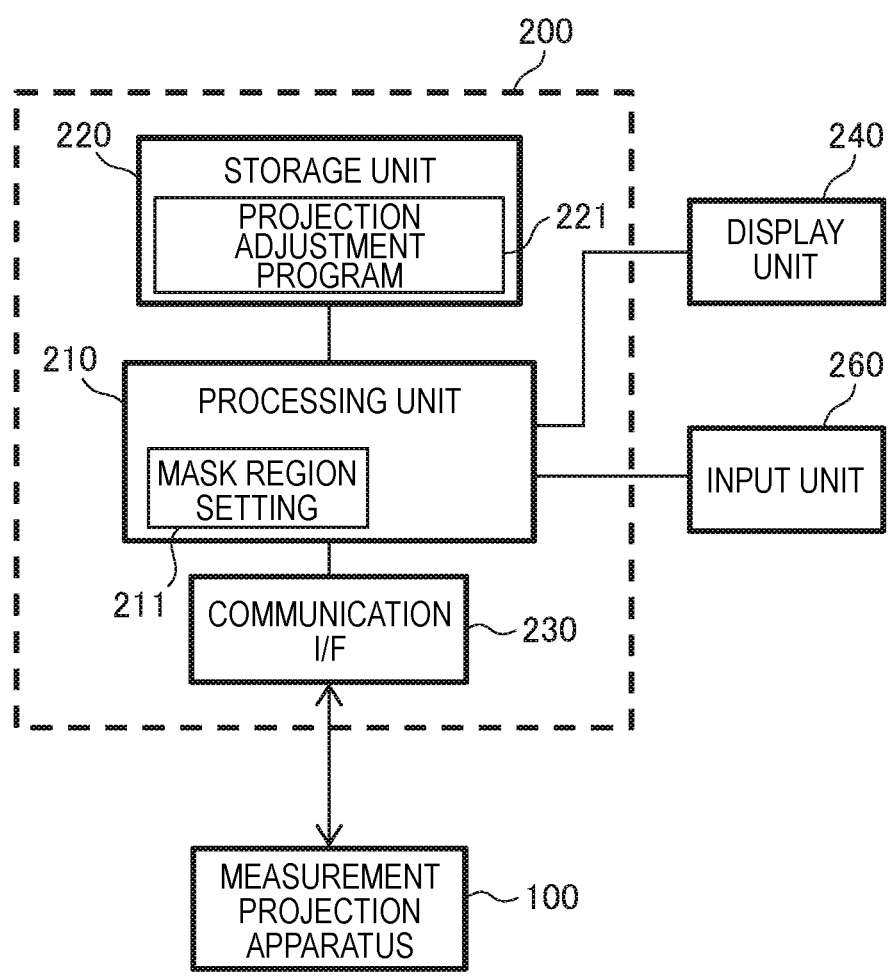
FIG. 7 is a block diagram showing a functional configuration of a projection adjustment apparatus according to the present embodiment.

FIG. 7 is a block diagram showing a functional configuration of the projection adjustment apparatus according to the present embodiment. The projection adjustment apparatus 200 includes a processing unit 210, a storage unit 220, and a communication interface (I/F) 230. The projection adjustment apparatus 200 is connected to the measurement projection apparatus 100 via the communication interface 230, and transmits and receives various pieces of information such as setting information on a measurement operation, projection range information, mask region information, and target object position measurement information. The projection adjustment apparatus 200 is connected to a display unit 240 and an input unit 260, displays the display screen on the display unit 240, and inputs an operation instruction from the input unit 260. The display unit 240 is configured with a display device such as the monitor 250 in FIG. 6. The input unit 260 is configured with an input device such as a keyboard, a mouse, a touch pad, and a touchscreen (not shown).

The storage unit 220 includes a storage device including at least one of a semiconductor memory such as a flash memory, a storage device such as a solid state drive (SSD) and a hard disk drive (HDD), and the like. The storage unit 220 stores a projection adjustment program 221 that performs a function related to adjustment of a projection operation.

The processing unit 210 includes a processor such as a central processing unit (CPU) and a digital signal processor (DSP). The processing unit 210 performs a processing according to the projection adjustment program 221 and implements a function such as mask region setting 211.

The communication interface 230 is an interface for transmitting and receiving information to and from an external apparatus such as the measurement projection apparatus 100 by wired communication or wireless communication. As a wired communication interface, for example, a universal serial bus (USB), an Ethernet (a registered trademark), or the like may be used. As a wireless communication interface, for example, Bluetooth (a registered trademark), a wireless LAN, or the like may be used.

As a function of the mask region setting 211, the projection adjustment apparatus 200 performs setting related to a mask region in the projection range of the measurement light based on a measurement result by the measurement projection apparatus 100, a predetermined condition, and the like.

The measurement projection apparatus 100 acquires information of a set mask region and performs the mask processing of limiting the part of the projection range in which the measurement light can be projected. The measurement projection apparatus 100 projects the measurement light to the projection range partially limited by the mask processing by the projection device 122, and receives reflected light of the measurement light by the image capturing device 101. Further, the measurement projection apparatus 100 calculates position information of the target objects 105 and 106 positioned within the projection range by the calculation device 103 based on the reflected light of the measurement light, and determines a projection position of a content based on the calculated position information of the target objects. Then, the measurement projection apparatus 100 projects the content to the determined projection position by the projection device 122.

A part or all of functions of the processing unit of the projection adjustment apparatus 200 may be provided in the calculation device 103 of the measurement projection apparatus 100, and may be performed such that a processing such as the mask region setting is performed in the measurement projection apparatus 100.

(Setting Example of Mask Region)

Here, some examples of setting a mask region in the projection system of the present embodiment will be described.

Figure 8:
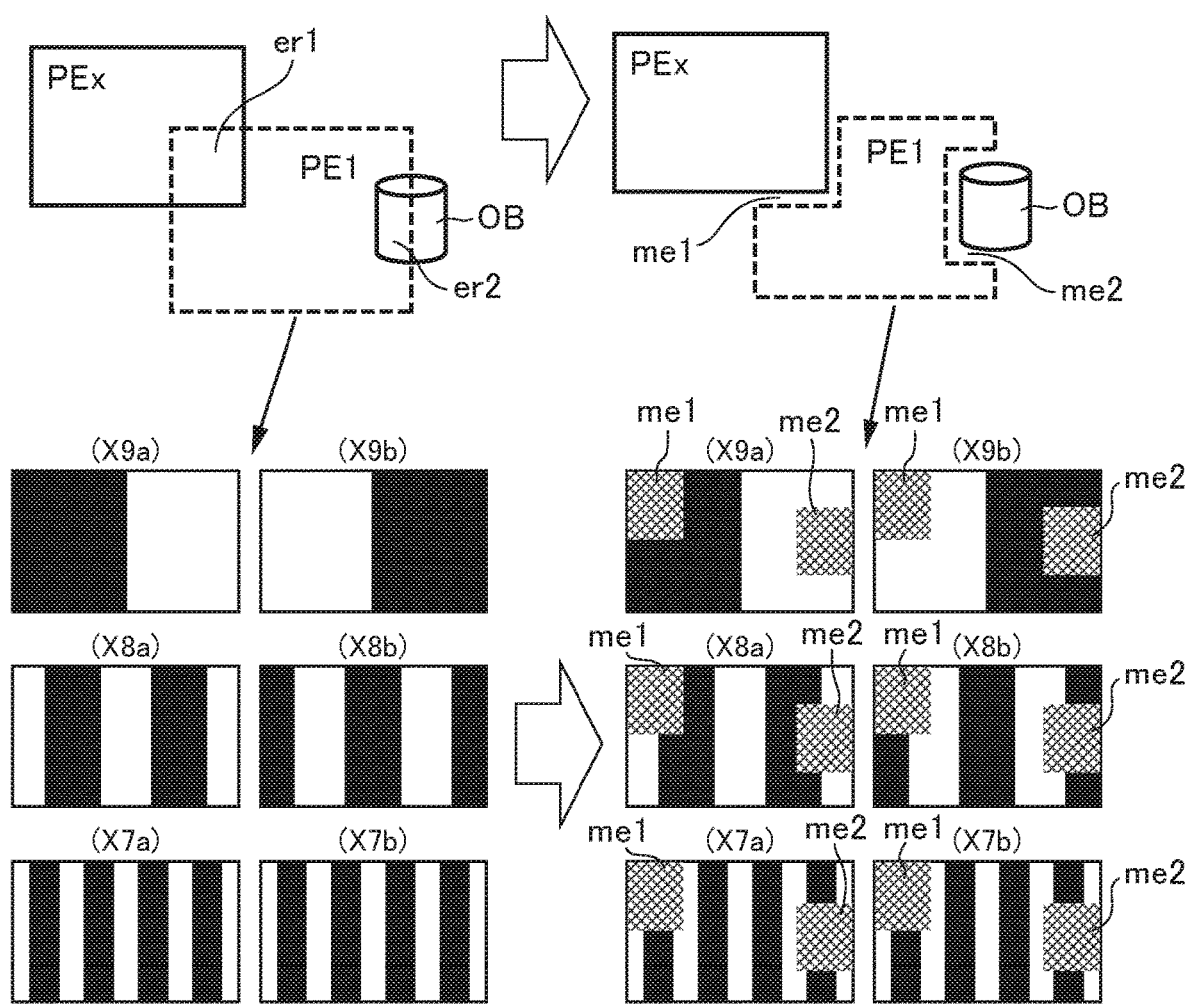
FIG. 8 is a diagram showing a first example of setting operations of mask regions in projection ranges of the projection system according to the present embodiment.

FIG. 8 is a diagram showing a first example of setting operations of mask regions in projection ranges of the projection system according to the present embodiment. The first example shows a setting example in a case where there is interference with a projection range of another measurement projection apparatus and there is an obstacle in the projection range. As shown in an upper left part of the drawing, it is assumed that, regarding the measurement projection apparatus 100 of interest, there are an area er1 that overlaps and interferes with a projection range PEx of another measurement projection apparatus and an area er2 where erroneous measurement occurs due to an unintended obstacle OB, in a projection range PE1 of the measurement light. For example, in a region where there is an unintended obstacle such as an object having a mirror surface, a measurement error occurs due to diffused reflection. Further, also for a region that interferes with measurement light of another measurement projection apparatus, there is a high possibility that erroneous measurement occurs, and it is considered that the region is a region where an unintended measurement error occurs in a broad sense.

In this case, the areas (error regions) er1 and er2 where a measurement error occurs due to the diffused reflection caused by the obstacle or the overlapping of the projection ranges are detected, mask regions me1 and me2 corresponding to the error regions are set as shown in an upper right part of the drawing, and measurement lights of the mask regions are blocked. That is, in each pattern image of the measurement light as shown in a lower left part of the drawing, the mask regions me1 and me2 are set as shown in a lower right part of the drawing, and pattern lights obtained by masking mask region portions are generated and projected. Similar to a black-and-white pattern of the pattern image, a mask processing of the mask region of the measurement light can be performed by blocking the measurement light in pixel units by the display device 113.

The mask regions me1 and me2 are shown to completely avoid the projection range PEx of another measurement projection apparatus and the obstacle OB for easy understanding in the drawing, and it is preferable to set the mask regions to be small such that the projection range PE1 is slightly applied to a boundary with another projection range PEx and the obstacle OB or another projection range PEx and the obstacle OB. Accordingly, when performing the position measurement, a measurement range can be appropriately overlapped at a boundary of the mask region, a connection portion with a position measurement result by another measurement projection apparatus can be smoothly connected and measured, and thus the position measurement can be performed more accurately.

With the setting of the mask regions and the mask processing, it is possible to appropriately mask a region where erroneous detection occurs due to the interference with the measurement light of another measurement projection apparatus or the obstacle, and to perform normal position measurement. The first example is applicable not only to a case where the position measurement and the video projection are performed by controlling the plurality of measurement projection apparatuses 100, but also to a case where the mask processing is performed in the single measurement projection apparatus 100 in an environment in which the measurement projection apparatus 100 is used together with another measurement projection apparatus that cannot be managed and controlled in an integrated manner, such as a different type of apparatus having a different specification. In this case, in the single measurement projection apparatus 100, when an error occurs, an error region may be set as a mask region based on a measurement result.

Figure 9:
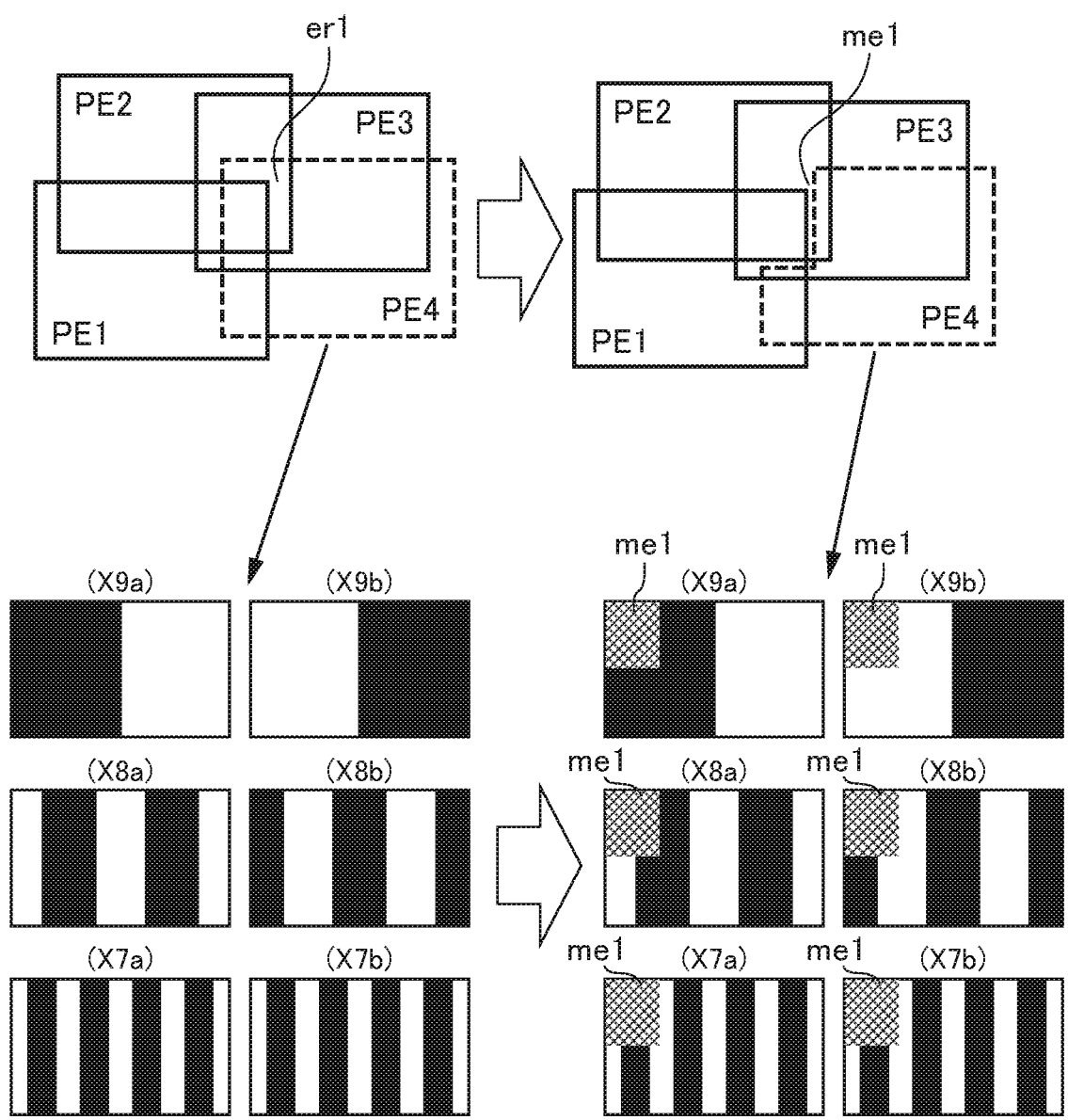
FIG. 9 is a diagram showing a second example of a setting operation of a mask region in projection ranges of the projection system according to the present embodiment.

FIG. 9 is a diagram showing a second example of a setting operation of a mask region in projection ranges of the projection system according to the present embodiment. The second example shows a setting example in a case where multiple projection such as the multi-plane projection is performed using the plurality of measurement projection apparatuses. As shown in an upper left part of the drawing, it is assumed that parts of projection ranges PE1, PE2, PE3, and PE4 of the measurement light by the four measurement projection apparatuses (P1 to P4) 100 overlap each other, and for example, there is the area er1 that interferes in the projection range PE4. In this case, an area (an error region) er1 where a measurement error occurs due to the interference is detected, the error region is set as the mask region me1 as shown in an upper right part of the drawing, and the measurement light of the mask region is blocked. That is, in each pattern image of the measurement light as shown in a lower left part of the drawing, the mask region me1 is set as shown in a lower right part of the drawing, and pattern light obtained by masking a mask region portion is generated and projected.

Here, when a plurality of projection ranges overlap as shown in the illustrated example, up to three projection ranges are allowed to overlap, a mask region is set in one of the projection ranges for a region having four or more overlaps, a part of the measurement light is masked, and the number of overlapping projection ranges is set to 3 or less. Accordingly, the number of phases when the plurality of measurement projection apparatuses are sequentially operated can be reduced, the number of divisions of position measurement and projection by time division can be reduced to enable efficient position measurement and projection in a short time, the interference of the measurement light can be prevented as much as possible to prevent a measurement error, and highly accurate position measurement can be performed.

The mask region me1 is shown to completely avoid four overlaps with the projection ranges PE1 to PE3 of other measurement projection apparatuses for easy understanding in the drawing, and it is preferable to set the mask region to be small, for example, to a boundary with other projection ranges PE1 to PE3, and to appropriately overlap the projection ranges with three or less overlaps. Accordingly, when performing the position measurement, a connection portion with position measurement results by other measurement projection apparatuses can be smoothly connected and measured at a boundary of the mask region, and the position measurement can be performed more accurately.

The projection adjustment apparatus 200 determines an order, a phase, a projection timing, and the like of projection operations of the plurality of measurement projection apparatuses in relation to the measurement projection apparatuses 100 to be controlled based on an arrangement of the projection ranges and the like. Further, the projection adjustment apparatus 200 can perform the position measurement by the measurement projection apparatuses 100 to be controlled, determine a mask region according to overlapping of the projection ranges and presence or absence of an obstacle, and notify the measurement projection apparatuses to set the mask region. A specific example of a processing of the projection adjustment program of the projection adjustment apparatus 200 will be described later.

In the present embodiment, an error region of the position measurement can be avoided by appropriately setting a mask region in the projection ranges of the measurement projection apparatuses 100 to perform the mask processing. Further, when the plurality of measurement projection apparatuses are used, interference of the measurement light among the measurement projection apparatuses can be prevented. Therefore, appropriate position measurement can be performed in the measurement projection apparatus of the projection system. For example, when performing the position measurement and the video projection on a moving target object such as a dancer by using the plurality of measurement projection apparatuses, it is possible to repeatedly perform the video projection while accurately measuring a position in real time. Further, when there are a fixed target object such as a screen and a moving target object such as a dancer, even in the projection system that uses the plurality of measurement projection apparatuses, it is possible to accurately measure positions of the target objects in real time, and to individually generate and project a video content according to the positions of the target objects.

(Operations of Projection Adjustment Apparatus)

Figure 10:
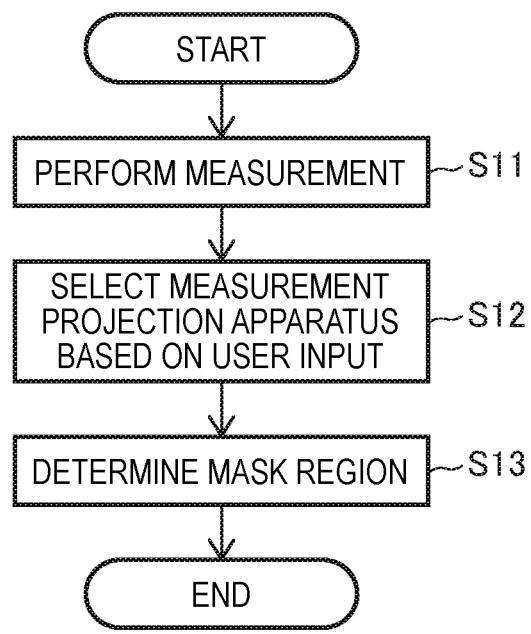
FIG. 10 is a flowchart showing a first example of a projection adjustment method by the projection adjustment apparatus according to the present embodiment.

FIG. 10 is a flowchart showing a first example of a projection adjustment method by the projection adjustment apparatus according to the present embodiment. The first example shows a schematic procedure of a setting processing of a mask region by the projection adjustment apparatus. Here, an example of a processing related to the mask region setting 211 by the projection adjustment program 221 is shown. The first example can be applied in any case of setting a mask region of a single measurement projection apparatus and setting a mask region when controlling a plurality of measurement projection apparatuses to perform the position measurement and the video projection.

The projection adjustment apparatus 200 performs the processing according to the projection adjustment program 221 in the processing unit 210. First, the projection adjustment apparatus 200 transmits an instruction to the measurement projection apparatus 100 to be controlled, and causes the measurement projection apparatus 100 to project the measurement light to perform the position measurement (S11). Next, the projection adjustment apparatus 200 selects the measurement projection apparatus that sets the mask region (that is, performs the mask processing) based on an operation input by the user (S12). At this time, the projection adjustment apparatus 200 selects a measurement projection apparatus that performs the mask processing according to a predetermined condition in consideration of various conditions such as designation of an apparatus based on user input, or a priority order of apparatuses, an arrangement of a projection range, a resolution or luminance of the video projection, and an operation mode such as manual setting or automatic setting. Then, the projection adjustment apparatus 200 sets the selected measurement projection apparatus to 100, determines overlapping of projection ranges and presence or absence of an obstacle by using a measurement result of step S11, and determines a mask region for an error region (S13). The determined mask region information is transmitted to the measurement projection apparatus that performs the mask processing to set the mask region.

According to the present embodiment, by setting the mask region in the error region of the projection range of the target measurement projection apparatus according to a predetermined condition such as the priority order, the error region of the projection range can be appropriately avoided when measuring a target object. Accordingly, it is possible to accurately perform the position measurement of the target object.

Figure 11:
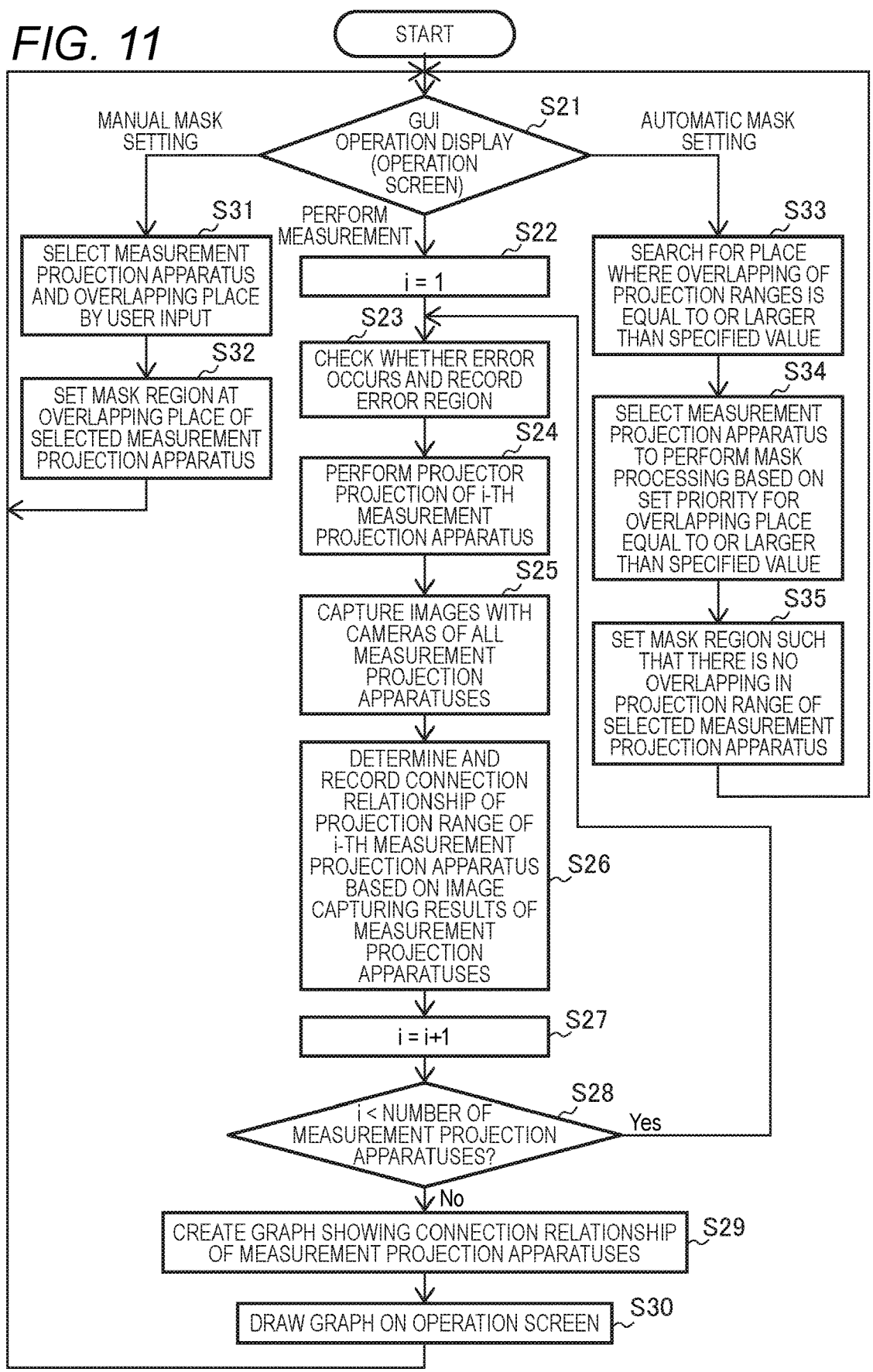
FIG. 11 is a flowchart showing a second example of the projection adjustment method by the projection adjustment apparatus according to the present embodiment.

FIG. 11 is a flowchart showing a second example of the projection adjustment method by the projection adjustment apparatus according to the present embodiment. The second example shows a procedure of a setting processing of a mask region when performing the position measurement and the video projection by controlling the plurality of measurement projection apparatuses. Here, an example of a processing related to the mask region setting 211 by the projection adjustment program 221 shows a processing procedure of determining an overlapping state of a plurality of projection ranges, determining a mask region, and displaying the projection ranges and projection timings of the measurement projection apparatuses.

The projection adjustment apparatus 200 performs the processing according to the projection adjustment program 221 in the processing unit 210. First, as a user interface, the projection adjustment apparatus 200 performs GUI operation display on the display unit 240, and displays an operation screen for a user operation (S21). Then, the projection adjustment apparatus 200 performs the following processing according to a user operation. When the user gives an operation instruction to perform the measurement, the projection adjustment apparatus 200 initializes a counter value for counting the measurement projection apparatuses as i=1 (S22), causes the i-th (1st in an initial state) measurement projection apparatus to project the measurement light to check whether an error occurs and records an error region when a measurement error occurs (S23). Subsequently, the projection adjustment apparatus 200 causes the i-th measurement projection apparatus to perform projector projection (S24). As the projector projection, the projection of the measurement light described above is performed. At this time, the projection adjustment apparatus 200 causes cameras of image capturing devices in all the measurement projection apparatuses to capture the projection of the measurement light by the i-th measurement projection apparatus (S25).

The projection adjustment apparatus 200 determines, regarding a projection range of the i-th measurement projection apparatus, a connection relationship of the projection range such as presence or absence of overlapping and which measurement projection apparatus overlaps based on image capturing results of all the measurement projection apparatuses, and records connection relationship information (S26). When there is overlapping of the projection ranges, an image of the measurement light is captured by other measurement projection apparatuses. A connection relationship of projection ranges of the plurality of measurement projection apparatuses can be determined by positions of the measurement projection apparatuses in which the image of the measurement light is captured.

Next, the projection adjustment apparatus 200 sets the counter value of the measurement projection apparatus to i=i+1 (S27), and determines whether the counter value i is smaller than the number of measurement projection apparatuses (S28). When the counter value i is smaller than the number of measurement projection apparatuses (S28: Yes), that is, when there is the measurement projection apparatus for which the determination of the connection relationship of the projection ranges has not been processed, the processings of steps S23 to S28 are repeated in the similar manner as described above. That is, the projection adjustment apparatus 200 checks the error region in order for all the measurement projection apparatuses, causes the measurement light to be projected, causes other measurement projection apparatuses to perform the operation of capturing the image of the measurement light, and determines the connection relationship of the projection ranges of the measurement projection apparatuses. The measurement processing of projecting the measurement light by each measurement projection apparatus and image capturing by all the measurement projection apparatuses may be performed only when the user gives an operation instruction to perform the measurement, or may be automatically performed at predetermined time intervals.

When the counter value i is equal to the number of measurement projection apparatuses (S28: No), the projection adjustment apparatus 200 generates projection position information indicating the connection relationship of the projection ranges of the measurement projection apparatuses. Here, as an example, a display screen of a graph display showing the connection relationship of the projection ranges is created (S29). Then, the projection adjustment apparatus 200 draws a graph on an operation screen of the display unit 240, and displays the graph showing the connection relationship of the projection ranges of the measurement projection apparatuses (S30).

When the user gives an operation instruction for manual mask setting, the projection adjustment apparatus 200 selects a measurement projection apparatus that performs the mask processing and an overlapping place of a projection range of the measurement projection apparatus based on an operation input by the user (S31). Then, the projection adjustment apparatus 200 sets a mask region for the overlapping place of the projection range of the selected measurement projection apparatus (S32). When there is an error region due to an obstacle or the like in a measurement result of the measurement projection apparatus, a mask region may be set in the error region without designation by the user. Information of the set mask region is transmitted to the target measurement projection apparatus that performs the mask processing to set the mask region.

When the user gives an operation instruction for automatic mask setting, the projection adjustment apparatus 200 searches for a place where overlapping of the projection ranges is equal to or larger than a specified value as a predetermined condition (S33). As the specified value of the overlapping, for example, 4 is used, and an overlapping place of four or more projection ranges is searched. Subsequently, the projection adjustment apparatus 200 selects a measurement projection apparatus to be masked based on priority information indicating a preset priority for the overlapping place equal to or larger than the specified value (S34). As the priority, a priority order of an apparatus set in the system, an arrangement of projection ranges, a resolution and luminance of video projection, and the like are appropriately used. For example, a projection range is secured by giving priority to an apparatus whose projection range is close to a center, an apparatus whose area of a projection range is large, an apparatus whose resolution is high, an apparatus whose luminance is high, an apparatus whose life of a light source is long, an apparatus whose overlapping number is large, and the like, and the mask processing is performed by other measurement projection apparatuses. Further, it is also possible to give priority to an apparatus that is not under management and difficult to control in the projection adjustment apparatus 200, such as a different type of apparatus having a different specification, an apparatus that does not have a mask function, and the like, and to perform the mask processing in an adjustable measurement projection apparatus. Then, the projection adjustment apparatus 200 sets a mask region such that there is no overlapping place in the projection range of the selected measurement projection apparatus (S35). When there is an error region due to an obstacle or the like in a measurement result of the measurement projection apparatus, a mask region may be set in the error region regardless of an overlapping place of the projection ranges. Information of the set mask region is transmitted to the target measurement projection apparatus that performs the mask processing to set the mask region.

Figure 12:
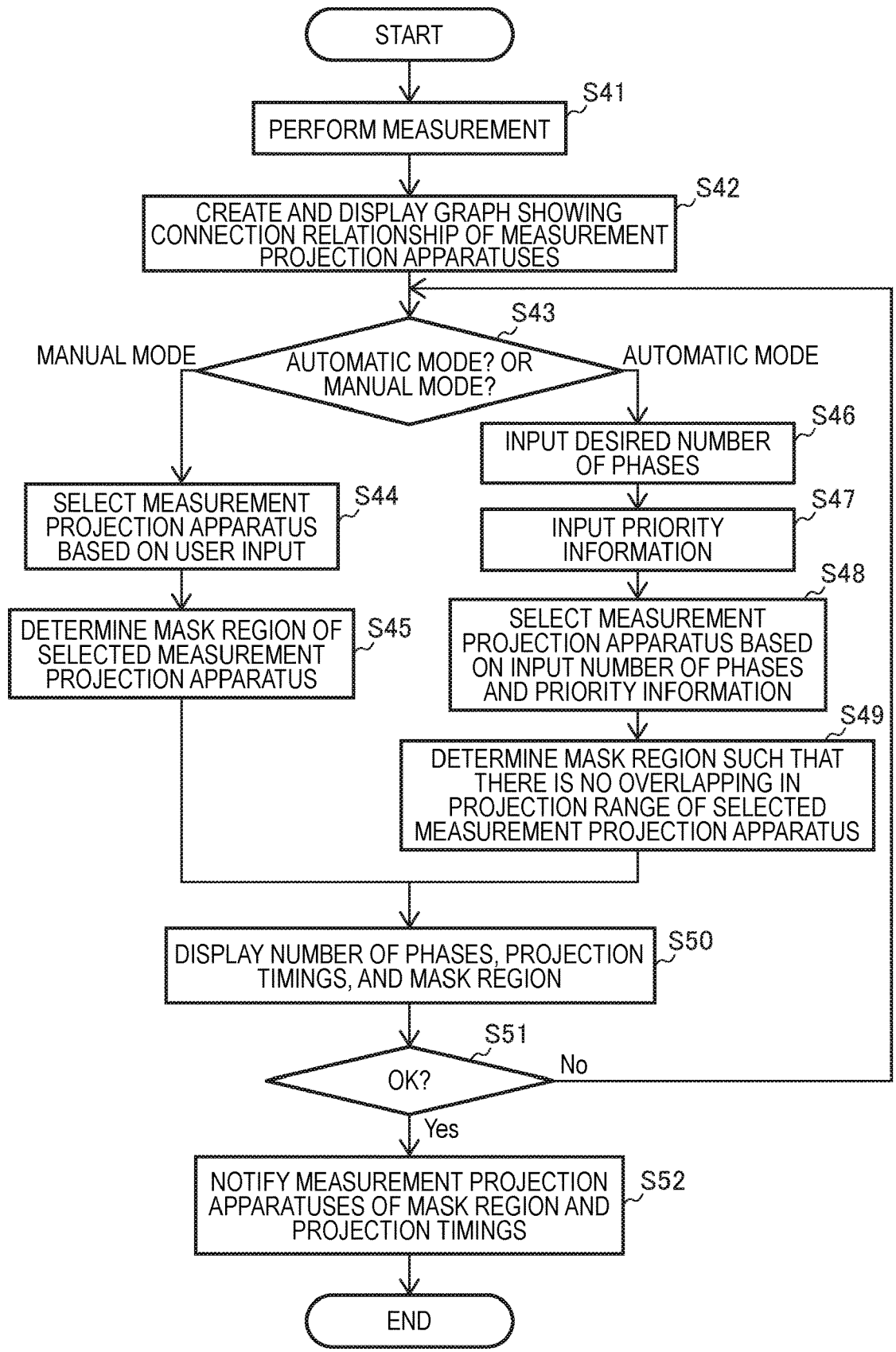
FIG. 12 is a flowchart showing a third example of the projection adjustment method by the projection adjustment apparatus according to the present embodiment.

FIG. 12 is a flowchart showing a third example of the projection adjustment method by the projection adjustment apparatus according to the present embodiment. The third example shows a procedure of a modified example of the second example. Here, an example of a processing related to the mask region setting 211 by the projection adjustment program 221 shows a processing procedure of determining an overlapping state of a plurality of projection ranges, determining a mask region, and displaying projection timings and a mask region of the measurement projection apparatuses.

The projection adjustment apparatus 200 performs the processing according to the projection adjustment program 221 in the processing unit 210. First, the projection adjustment apparatus 200 transmits an instruction to the measurement projection apparatus 100 to be controlled, and causes the measurement projection apparatus 100 to project the measurement light to perform the position measurement (S41). Next, the projection adjustment apparatus 200 checks the overlapping state of the projection ranges and determines a connection relationship of the projection ranges by, for example, the same processing as the processings of S22 to S28 in FIG. 11. Then, the projection adjustment apparatus 200 generates projection position information indicating the connection relationship of the projection ranges of the measurement projection apparatuses. Here, as an example, a display screen of a graph display showing the connection relationship of the projection ranges is created. Further, the projection adjustment apparatus 200 draws a graph on an operation screen of the display unit 240, and displays a graph showing the connection relationship of the projection ranges of the measurement projection apparatuses (S42).

Next, the projection adjustment apparatus 200 determines whether an operation mode set by an operation input of the user or the like is an automatic mode in which mask setting is automatically performed or a manual mode in which the mask setting is manually performed (S43). As a user interface, a GUI operation display may be performed on the display unit 240 to display an operation screen for a user operation, and user input in the automatic mode or the manual mode may be received.

In a case of the manual mode, the projection adjustment apparatus 200 selects the measurement projection apparatus that performs the mask processing based on an operation input by the user (S44). At this time, information of a region of an overlapping place of a projection range of the measurement projection apparatus designated by the user input and of an error region is acquired. Then, the projection adjustment apparatus 200 determines a mask region of the projection range of the selected measurement projection apparatus so as to avoid overlapping and an error of the projection range (S45). When there is an error region due to an obstacle or the like in a measurement result of the measurement projection apparatus, a mask region may be set in the error region without designation by the user.

In a case of the automatic mode, the projection adjustment apparatus 200 inputs desired number of phases of projection operations of the plurality of measurement projection apparatuses (S46) and inputs priority information of the measurement projection apparatuses (S47) as a predetermined condition. The number of phases and the priority information may be input as, for example, set values as initial values set in advance, or may be acquired based on an operation input by the user. Further, the number of phases and the priority order may be determined and input according to the connection relationship of the plurality of projection ranges acquired by the measurement processing in step S41. For number of phases, for example, 2 or 3 is used. As the priority, a priority order of the apparatuses set in the system, an arrangement of the projection ranges, resolution and luminance of the video projection, a designation order according to the user, and the like are appropriately used. Then, the projection adjustment apparatus 200 selects the measurement projection apparatus that performs the mask processing based on the input number of phases and priority information (S48). Subsequently, the projection adjustment apparatus 200 determines a mask region such that there is no overlapping place in a projection range of the selected measurement projection apparatus (S49). When there is an error region due to an obstacle or the like in a measurement result of the measurement projection apparatus, a mask region may be set in the error region regardless of an overlapping place of the projection ranges.

It is also possible to perform a combination of the manual mode and the automatic mode. For example, a procedure may be in such a way that a recommended mask region is temporarily determined by an automatic mode processing, and the mask region is determined by selecting, partially changing, or adjusting a region based on user input by a manual mode processing, and the like.

Next, the projection adjustment apparatus 200 generates and displays projection information indicating the number of phases of the measurement projection apparatus of the projection system, the projection timings of the measurement projection apparatuses, the mask region of the projection ranges, and the like (S50). As an example of projection information for display, the projection adjustment apparatus 200 creates a display screen such as an image display in which the projection ranges of the measurement projection apparatuses are indicated by a figure or the like, a graph display in which a connection relationship such as overlapping of the projection ranges is indicated by a node, a connection line, or the like, a timing display in which the projection timings of the measurement projection apparatuses are indicated, and an image display in which the mask region of the projection ranges is indicated by a figure or the like. Then, the projection adjustment apparatus 200 draws a character, a figure, a graph, or the like on the operation screen of the display unit 240, and performs the above-described image display, graph display, timing display, and the like.

Then, the projection adjustment apparatus 200 waits for an operation input by the user to perform setting check, and checks whether an instruction input of "OK" is received from the user (S51). When the instruction of the setting OK is not acquired from the user, the projection adjustment apparatus 200 returns to step S43 and performs the processings of steps S43 to S51 again. When receiving the instruction of the setting OK from the user, the projection adjustment apparatus 200 notifies the measurement projection apparatuses of information of the set mask region and the set projection timings, causes the measurement projection apparatuses to set the projection timings, and causes the target measurement projection apparatus that performs the mask processing to set the mask region (S52).

Accordingly, by detecting an error region by performing the position measurement in one or a plurality of measurement projection apparatuses and setting a mask region in a projection range of the target measurement projection apparatus by the manual setting or the automatic setting, it is possible to appropriately avoid the error region of the projection range when measuring the target object.

Here, some examples of a display screen on which the projection ranges, the projection timings, the mask region, and the like are displayed are shown.

Figure 13:
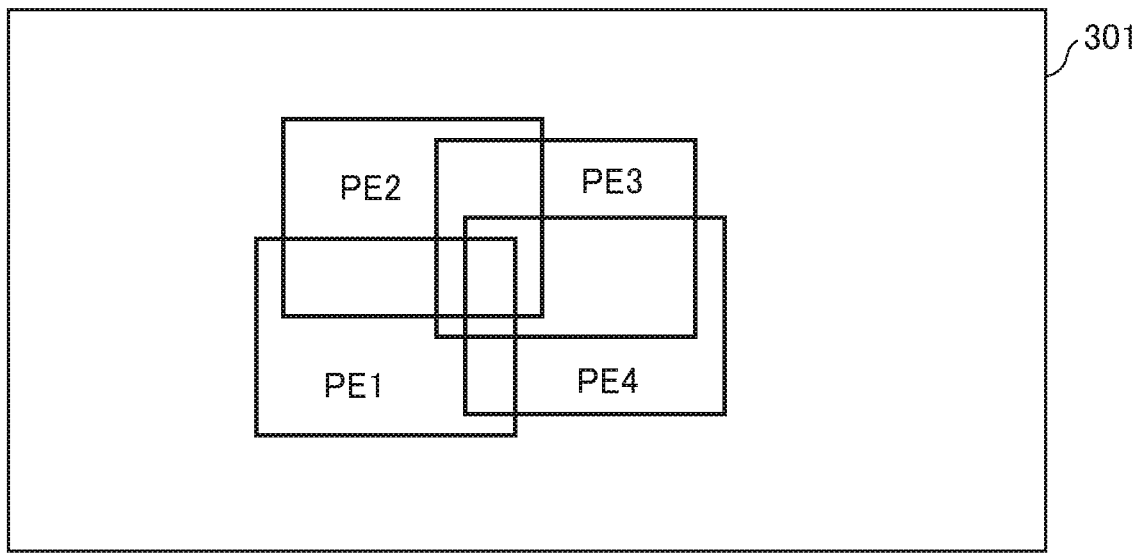
FIG. 13 is a diagram showing a first example of a display screen by the projection adjustment apparatus according to the present embodiment.
Figure 13:
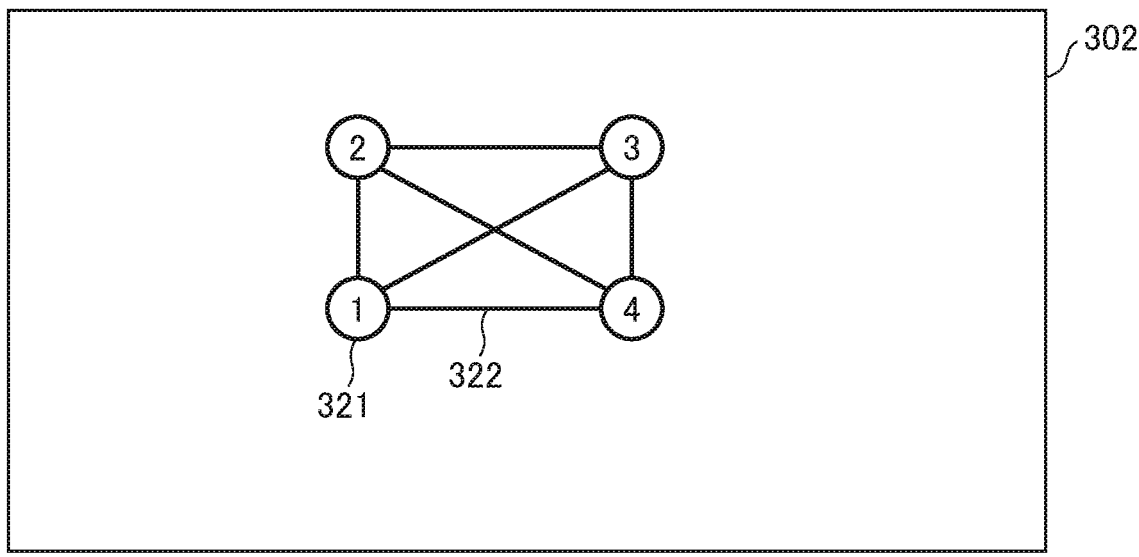

FIG. 13 is a diagram showing a first example of the display screen by the projection adjustment apparatus according to the present embodiment. The first example is an example of the display screen including an image display 301 showing the arrangement of the projection ranges of the plurality of measurement projection apparatuses and a graph display 302 showing the connection relationship of the projection ranges. In the image display 301, the arrangement of the projection ranges PE1 to PE4 by the four measurement projection apparatuses P1 to P4 is schematically represented by a quadrangular graphic display. The overlapping place of the projection ranges may be highlighted in a distinguished manner by a color, a pattern, or the like. Accordingly, the user can easily grasp a region where the projection ranges overlap and an overlapping state by the image display. In the graph display 302, positions of the projection ranges of the four measurement projection apparatuses P1 to P4 are displayed by nodes 321 such as circular marks, and are represented by a graph in which the nodes 321 where the projection ranges overlap and a connection relationship exists are connected by connection lines 322. With the graph display, the user can check the connection relationship of the projection ranges of the measurement projection apparatuses at a glance. Further, it is also possible to display and grasp overlapping numbers, overlapping positions, and the like of the projection ranges.

Figure 14:
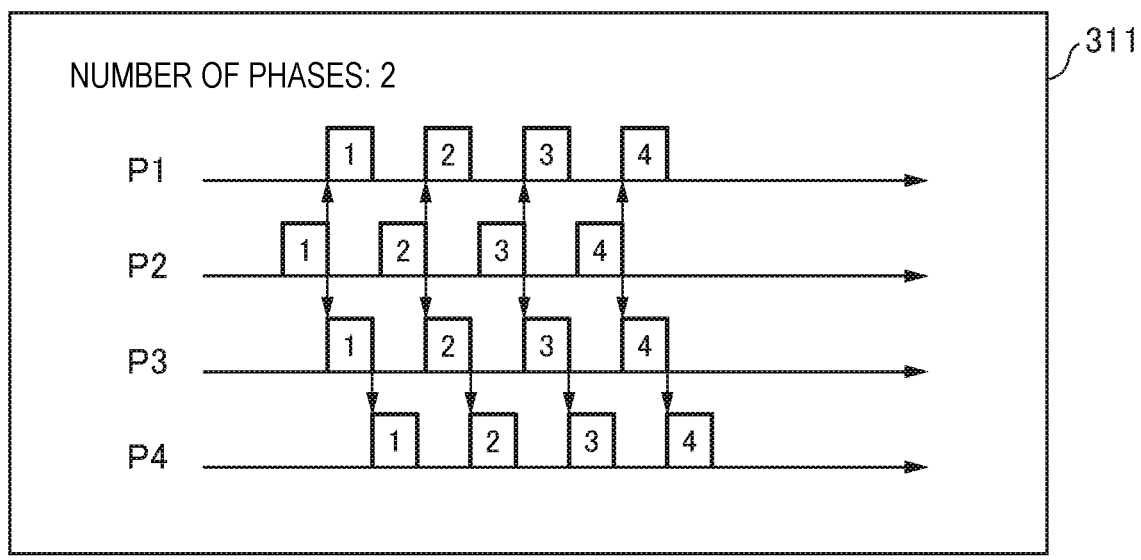
FIG. 14 is a diagram showing a second example of the display screen by the projection adjustment apparatus according to the present embodiment.
Figure 14:
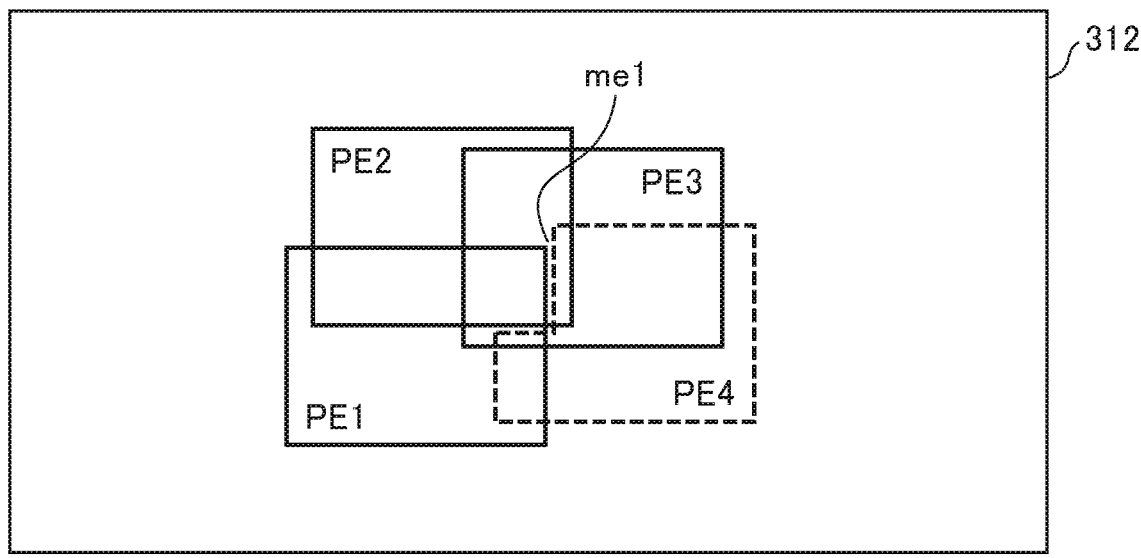

FIG. 14 is a diagram showing a second example of the display screen by the projection adjustment apparatus according to the present embodiment. The second example is an example of a display screen including a timing display 311 showing the number of phases and projection timings of the plurality of measurement projection apparatuses and an image display 312 showing a mask region of the projection ranges of the plurality of measurement projection apparatuses. The timing display 311 shows the number of phases (the number of phases=2) of the projection system including the four measurement projection apparatuses P1 to P4, and shows the projection timings of the measurement projection apparatuses P1 to P4 by a timing chart. The illustrated example shows an operation of performing time-division projection by using two phases by causing the four measurement projection apparatuses to sequentially emit light. The user can easily grasp the projection timings of the measurement projection apparatuses. In the image display 312, the mask region me1 is schematically represented by a graphic display in the projection ranges PE1 to PE4 by the four measurement projection apparatuses P1 to P4. The projection range including the mask region, that is, the projection range (PE4 in the illustrated example) in which the mask processing is performed may be highlighted in a distinguished manner by a different color, a different pattern, or the like. Further, priority information of the measurement projection apparatuses and the projection ranges may be displayed. Thereby, the user can easily check the mask region. Further, the user can also set and adjust an order, the phases, the projection timings, and the like of the projection operations of the plurality of measurement projection apparatuses based on display of the projection position information.

With the display screen as in the above example, the user can easily grasp a positional relationship of the projection ranges, the projection timings, the mask region, and the like of the plurality of measurement projection apparatuses, and can provide display of the projection position information with good visibility. Therefore, it is possible to effectively support adjustment work of the projection operations when the user sets the mask region of the measurement projection apparatuses.

(Setting Example of Mask region of Plurality of Apparatuses)

Figure 15:
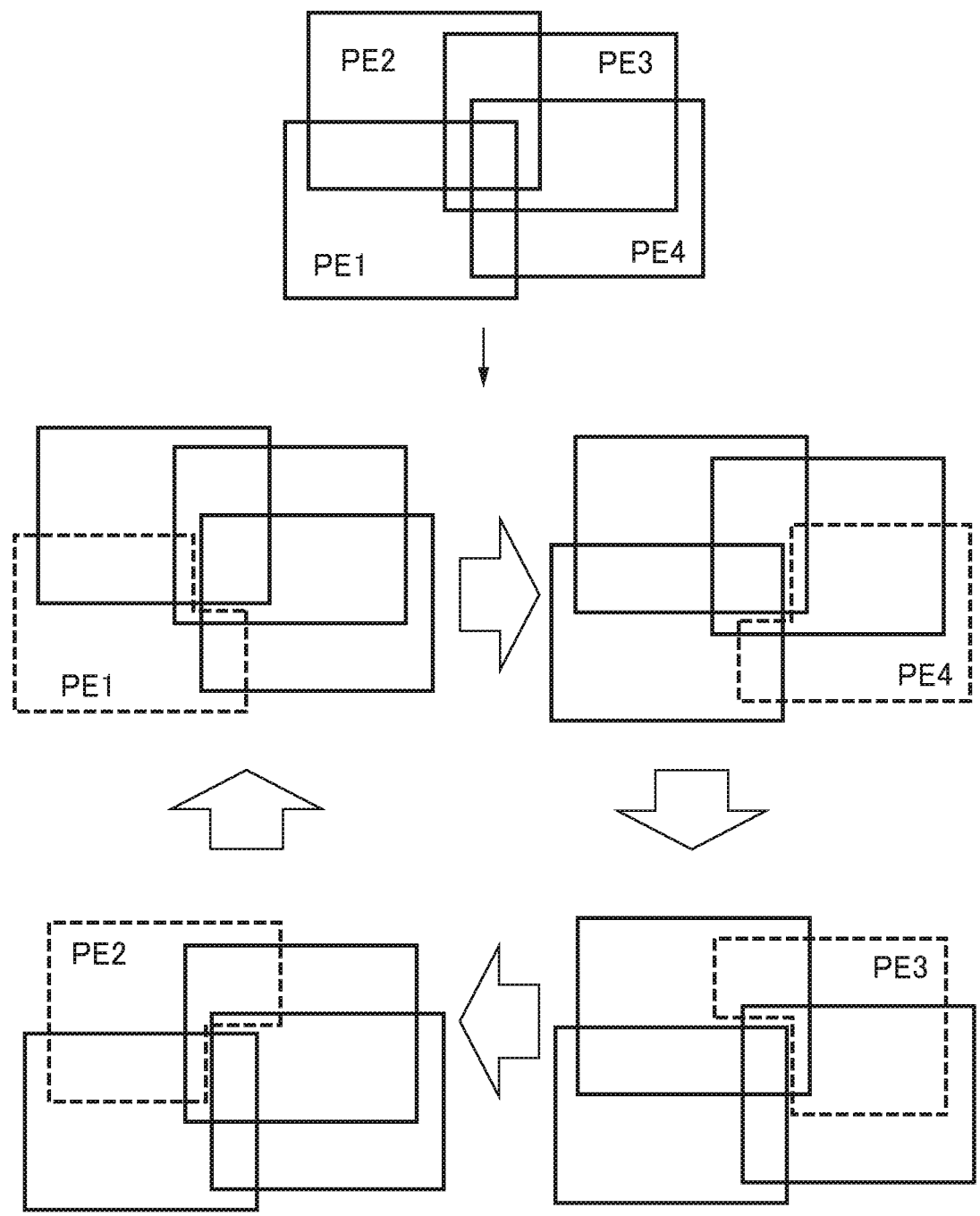
FIG. 15 is a diagram illustrating a setting example of a mask region of a plurality of measurement projection apparatuses of the projection system according to the present embodiment.

FIG. 15 is a diagram illustrating a setting example of a mask region of the plurality of measurement projection apparatuses of the projection system according to the present embodiment. Here, an example of dynamically setting the mask region when performing the mask processing in the plurality of measurement projection apparatuses is shown.

Here, in the projection system, it is assumed that there is an overlapping place where the projection ranges PE1 to PE4 by the four measurement projection apparatuses P1 to P4 overlap with each other and overlap four times at the maximum. Then, a maximum value of overlapping numbers of the overlapping place is set to 3, and the mask region is set such that the overlapping numbers are equal to or smaller than 3. Accordingly, a maximum value of the number of phases of the measurement projection apparatus is 3, and the number of phases can be reduced. In this case, the mask region may be set in the projection range of any one of the measurement projection apparatuses and masked.

The mask region is not limited to one that is fixedly set with respect to a projection range of a specific measurement projection apparatus, and it is possible to dynamically set the mask region by switching a measurement projection apparatus that performs the mask processing. For example, as shown on a lower side of FIG. 15, a projection range (indicated by a broken line in the drawing) in which a mask region is provided is switched in time series such as PE4→PE3→PE2→PE1, and the mask region is allocated in a time division manner, so that a measurement projection apparatus that performs the mask processing is rotated. In this case, in one measurement projection apparatus, masking is performed at a rate of 1 out of 4 projections of the measurement light. Accordingly, in the overlapping region of the projection ranges, it is possible to measure the overlapping place by all the measurement projection apparatuses. For example, when there is a target object that moves across the overlapping region, it is possible to seamlessly and smoothly track a position of the target object, and it is possible to improve accuracy of position measurement.

(Another Setting Example of Mask Region)

As another setting example related to a mask region, when there is a target object or an obstacle that moves in a projection range and an error region is displaced, it is also possible to dynamically set the mask region in response to a change in a position of the error region and displace the region to be masked. In this case, by repeating a processing of measuring a position of the target object or the obstacle and setting the mask region based on a measurement result at predetermined timings during a projection period, it is possible to perform the dynamically displaced mask region setting and the dynamically displaced mask processing.

Further, the mask region is not limited to a region where the mask processing is performed on the measurement light in a projection range, and it is also possible to perform the mask processing on video projection of the visible light. In this case, both the measurement light and the visible light may be subjected to the mask processing in the same mask region, or different mask regions may be set for the measurement light and the visible light to perform the mask processing.

As described above, a projection system of the present embodiment is a projection system including a measurement projection apparatus 100 as a projection apparatus configured to perform position measurement and projection on target objects 105 and 106. The measurement projection apparatus 100 includes an invisible light projection unit configured to project measurement light of invisible light onto the target objects, an image capturing device 101 as a light reception unit configured to receive reflected light of measurement light reflected from the target objects, and a calculation device 103 as a calculation unit configured to calculate position information of the target objects based on reflected light of the measurement light. The measurement projection apparatus 100 includes, for example, a projection device 122 including the invisible light projection unit that includes an infrared LED light source 112 and a visible light projection unit that includes a visible light LED light source 114. The measurement projection apparatus 100 is configured to perform a mask processing of limiting a part of a projection range in which the measurement light can be projected. Accordingly, it is possible to appropriately avoid an error region of the projection range when measuring the target objects in the projection system.

The projection system includes a projection adjustment apparatus 200 including a processing unit 210 configured to perform a setting processing for a mask processing of limiting a part of the projection range of the measurement light by the measurement projection apparatus 100. The processing unit 210 projects the measurement light by the measurement projection apparatus 100 to perform position measurement, detects an error region where a defect occurs in a measurement result of the position measurement, and sets, for a target measurement projection apparatus 100, a mask region when projecting the measurement light by using a measurement result of the error region.

Accordingly, by using the measurement result of the error region, for example, it is possible to appropriately set a mask region such that the measurement light is not projected onto the error region, and to perform the mask processing of limiting a part of the projection range. Therefore, the mask region can be appropriately set in the projection range and the measurement light of a portion of the mask region is masked, so that the error area of the projection range can be appropriately avoided when measuring the target objects. Accordingly, the position measurement of the target objects can be accurately performed.

In the projection system, the processing unit 210 detects a region where a measurement error occurs due to an obstacle in the projection range as the error region, and sets the mask region for the region. Accordingly, the mask processing can be performed using the region where the measurement error occurs as the error region, and the position measurement of the target objects can be accurately performed.

Further, in the projection system, the processing unit 210 detects a region where measurement light from another measurement projection apparatus overlaps in the projection range as the error region, and sets the mask region for the region. Accordingly, the mask processing can be performed using the overlapping region of the projection range as the error region, and the position measurement of the target objects can be accurately performed.

The projection system includes a plurality of measurement projection apparatuses 100. The processing unit 210 is configured to cause a first measurement projection apparatus of the projection system to project the measurement light onto the target objects, cause a second measurement projection apparatus of the projection system to receive reflected light of the measurement light reflected from the target objects, determine a connection relationship of a projection range of the first measurement projection apparatus based on the received reflected light of the measurement light, perform a determination processing of the connection relationship for all measurement projection apparatuses to be processed, detect, as the error region, a region where measurement light from another measurement projection apparatus overlaps in projection ranges of measurement projection apparatuses of the projection system, and set the mask region for the region. Accordingly, in the projection system including the plurality of measurement projection apparatuses, an overlapping region of the projection ranges of the measurement projection apparatuses can be detected, and a mask region can be appropriately set in a projection range of a target measurement projection apparatus according to a predetermined condition such as a priority order. Therefore, in any one of the plurality of measurement projection apparatuses, the measurement light can be projected while avoiding the overlapping region in the projection range, and the position measurement of the target objects can be accurately performed. Further, even in other measurement projection apparatuses, overlapping of the measurement light can be avoided, and the position measurement of the target objects can be accurately performed.

In the projection system, the processing unit 210 is configured to receive an operation input by a user, select a measurement projection apparatus configured to perform the mask processing and an error region of a projection range of the measurement projection apparatus based on the operation input, and set a mask region for an error region of the selected measurement projection apparatus. Accordingly, a desired mask region can be manually set based on the operation input of the user.

In the projection system, the processing unit 210 is configured to input a condition including predetermined priority information, select a measurement projection apparatus configured to perform the mask processing and an error region of a projection range of the measurement projection apparatus based on the condition, and set a mask region for an error region of the selected measurement projection apparatus. Accordingly, an appropriate mask region can be automatically set based on the predetermined condition.

In the projection system, the processing unit 210 is configured to input a condition including predetermined priority information, select a measurement projection apparatus configured to perform the mask processing and an error region of a projection range of the measurement projection apparatus based on the condition, temporarily determine a mask region for an error region of the selected measurement projection apparatus, receive an operation input by a user, determine the mask region based on the operation input, and set the determined mask region. Accordingly, an appropriate mask region such as recommended setting can be automatically presented to the user based on the predetermined condition, and a desired mask region can be manually set based on the operation input of the user. Further, flexible and more appropriate mask region setting such as a partial change, a fine adjustment, and a readjustment of mask region setting is possible.

In the projection system, the processing unit 210 performs the position measurement at predetermined time intervals, and when the error region is displaced, the processing unit 210 dynamically sets the mask region according to a position change of the error region. Accordingly, for example, when the target objects or the obstacle moves, the mask region can be set in conjunction with the displacement of the error region, and accurate position measurement of the target objects can be performed.

In the projection system, the processing unit 210 allocates the mask region to the plurality of measurement projection apparatuses in a time division manner by switching a measurement projection apparatus that performs the mask processing. Accordingly, in the projection system including the plurality of measurement projection apparatuses, the mask processing can be performed alternately by the measurement projection apparatuses, and the position measurement of the target objects can be accurately performed. In this case, a measurement result can be smoothly connected at a boundary portion with a projection range of another measurement projection apparatus, and accuracy of the position measurement can be improved.

A projection adjustment program of the present embodiment is a projection adjustment program configured to perform a processing related to adjustment of a projection operation of a measurement projection apparatus 100 by a computer in a projection system including the measurement projection apparatus 100 as a projection apparatus configured to perform position measurement and projection on target objects 105 and 106. The projection adjustment program is configured to cause the measurement projection apparatus 100 of the projection system to project measurement light of invisible light onto the target objects, receive reflected light of measurement light reflected from the target objects, and calculate position information of the target objects based on reflected light of the measurement light, so that position measurement is performed. Further, the projection adjustment program is configured to detect an error region where a defect occurs in a measurement result of the position measurement, and set, for a target measurement projection apparatus 100, a mask region for a mask processing of limiting a part of a projection range when projecting the measurement light by using a measurement result of the error region. Accordingly, when measuring the target objects, the error region of the projection range can be appropriately avoided.

A projection method of the present embodiment includes: a step of causing a measurement projection apparatus 100 to perform a mask processing of limiting a part of a projection range in which measurement light of invisible light is projected; a step of projecting the measurement light onto a projection range partially limited by the mask processing; a step of receiving reflected light of the measurement light; a step of calculating position information of target objects 105 and 106 positioned within the projection range based on reflected light of the measurement light; a step of determining a projection position of a content based on the calculated position information of the target objects; and a step of projecting the content onto the determined projection position. Accordingly, when measuring the target objects in the projection system, the error region of the projection range can be appropriately avoided.

Although the embodiments are described above with reference to the drawings, it is needless to say that the present invention is not limited thereto. It will be apparent to those skilled in the art that various changes and modifications may be conceived within the scope of the claims. It is also understood that the various changes and modifications belong to the technical scope of the present invention. Components in the embodiments described above may be combined freely within a range not departing from the spirit of the present invention.

The present application is based on Japanese Patent Application (Japanese Patent Application No. 2018-117208) filed on Jun. 20, 2018, and contents thereof are incorporated by reference in the present application.

INDUSTRIAL APPLICABILITY

The present disclosure is useful as a projection system, a projection adjustment program, and a projection method that can appropriately avoid an error region of a projection range when measuring a target object in a projection system.

REFERENCE SIGNS LIST 100 measurement projection apparatus
101 image capturing device
103 calculation device
105 first target object
106 second target object
111 lens optical system
112 infrared LED light source
113 display device
114 visible light LED light source
115 dichroic mirror
122 projection device
200 projection adjustment apparatus
210 processing unit
220 storage unit
221 projection adjustment program
230 communication interface (I/F)
240 display unit
250 monitor
260 input unit
401 image input unit
402 pattern decoding unit
405 coordinate conversion unit
407 coordinate interpolation unit
408 content generation unit
410 image output unit
411 pattern generation unit

The invention claimed is:

1. A projection system comprising:
a projection apparatus configured to perform position measurement and projection on a target object; and
a processor configured to perform a setting processing for mask processing by the projection apparatus,
wherein the projection apparatus comprises:
an invisible light projector configured to project measurement light of invisible light onto the target object;
a light receiver configured to receive reflected light of the measurement light reflected from the target object; and
a calculator configured to calculate position information of the target object based on the reflected light of the measurement light, and
wherein the projection apparatus is configured to perform the mask processing of limiting a part of a projection range in which the measurement light is projected,
the processor is configured to cause the projection apparatus to project the measurement light to perform the position measurement, and to detect an error region where a defect occurs in a measurement result of the position measurement,
the processor is configured to set, for a target projection apparatus, a mask region at a time of projecting the measurement light by using the measurement result of the error region, and
the processor is configured to detect a region where a measurement error occurs due to an obstacle in the projection range as the error region, and set the mask region for the region.

2. The projection system according to claim 1, wherein the processor is further configured to detect a second region where measurement light from another projection apparatus overlaps in the projection range as the error region, and set the mask region for the second region.

3. The projection system according to claim 1, further comprising:
a plurality of projection apparatuses,
wherein the processor is configured to:
cause a first projection apparatus of the projection system to project the measurement light onto the target object;
cause a second projection apparatus of the projection system to receive reflected light of the measurement light reflected from the target object;
determine a connection relationship of a projection range of the first projection apparatus based on the received reflected light of the measurement light;
perform a determination process of the connection relationship for all projection apparatuses to be processed;
further detect, as the error region, a second region where measurement light from another projection apparatus overlaps in a projection range of each of the projection apparatuses of the projection system; and
set the mask region for the second region.

4. The projection system according to claim 3, wherein the processor is configured to allocate the mask region to the plurality of projection apparatuses in a time division manner by switching a projection apparatus to perform the mask processing.

5. The projection system according to claim 1, wherein the processor is configured to receive an operation input by a user, select a projection apparatus to perform the mask processing and an error region of a projection range of the projection apparatus based on the operation input, and set the mask region for the error region of the selected projection apparatus.

6. The projection system according to claim 1, wherein the processor is configured to input a condition including predetermined priority information, select a projection apparatus to perform the mask processing and an error region of a projection range of the projection apparatus based on the condition, and set the mask region for the error region of the selected projection apparatus.

7. The projection system according to claim 1, wherein the processor is configured to:
input a condition including predetermined priority information, select a projection apparatus to perform the mask processing and an error region of a projection range of the projection apparatus based on the condition, and temporarily determine the mask region for the error region of the selected projection apparatus;

receive an operation input by a user, and determine the mask region based on the operation input; and set the determined mask region.

8. The projection system according to claim 1, wherein the processor is configured to perform the position measurement at predetermined time intervals, and wherein, if the error region is displaced, the processor dynamically sets the mask region in accordance with a position change of the error region.

9. A non-transitory computer-readable storage medium that stores a projection adjustment program, the projection adjustment program, when executed by a processor, configured to cause a computer to perform processing related to adjustment of a projection operation of a projection apparatus in a projection system, the projection system comprising the projection apparatus and a processor, the projection apparatus configured to perform position measurement and projection on a target object, the processor configured to perform a setting processing for mask processing by the projection apparatus, the processing comprising:

performing position measurement by causing the projection apparatus of the projection system to project measurement light of invisible light onto the target object, receive reflected light of the measurement light reflected from the target object, and calculate position information of the target object based on the reflected light of the measurement light, detecting an error region where a defect occurs in a measurement result of the position measurement, and setting, for a target projection apparatus, a mask region for the mask processing of limiting a part of a projection range at a time of projecting the measurement light by using the measurement result of the error region, wherein the processing is configured to detect a region where a measurement error occurs due to an obstacle in the projection range as the error region, and to set the mask region for the region.

10. A projection method, comprising:

causing a projection apparatus to perform position measurement and projection on a target object; and causing a processor to perform a setting processing for mask processing of limiting a part of a projection range in which measurement light of invisible light is projected, wherein the projection apparatus performs the position measurement and projection on the target object by:

projecting the measurement light onto the projection range partially limited by the mask processing;

receiving reflected light of the measurement light;

calculating position information of the target object positioned within the projection range based on the reflected light of the measurement light;

determining a projection position of a content based on the calculated position information of the target object; and projecting the content onto the determined projection position, the processor is configured to cause the projection apparatus to project the measurement light to perform the position measurement, and to detect an error region where a defect occurs in a measurement result of the position measurement, the processor is configured to set, for a target projection apparatus, a mask region at a time of projecting the measurement light by using the measurement result of the error region, and the processor is configured to detect a region where a measurement error occurs due to an obstacle in the projection range as the error region, and set the mask region for the region.

* * * * *